(12) United States Patent
Yokono

(10) Patent No.: US 8,606,022 B2
(45) Date of Patent: Dec. 10, 2013

(54) INFORMATION PROCESSING APPARATUS, METHOD AND PROGRAM

(75) Inventor: Jun Yokono, Tokyo (JP)

(73) Assignee: Sony Corporation, Tokyo (JP)

( * ) Notice: Subject to any disclaimer, the term of this patent is extended or adjusted under 35 U.S.C. 154(b) by 344 days.

(21) Appl. No.: 13/038,908

(22) Filed: Mar. 2, 2011

(65) Prior Publication Data

US 2011/0235926 A1  Sep. 29, 2011

(30) Foreign Application Priority Data

Mar. 23, 2010  (JP) .................................. 2010-066633

(51) Int. Cl.
*G06K 9/62* (2006.01)

(52) U.S. Cl.
USPC ........... 382/225; 382/226; 382/224; 382/118; 382/159; 382/231; 382/128; 382/133; 382/161; 382/165; 382/170

(58) Field of Classification Search
CPC . G06F 17/30256; G06F 3/017; G06K 9/6218; G06K 2209/27; G06K 9/6272
USPC ......... 382/225, 226, 224, 118, 159, 201, 231, 382/128, 133, 161, 165, 170
See application file for complete search history.

(56) References Cited

U.S. PATENT DOCUMENTS

| | | | | |
|---|---|---|---|---|
| 6,108,446 | A * | 8/2000 | Hoshen .......................... | 382/225 |
| 2007/0086660 | A1 * | 4/2007 | Ai et al. ........................ | 382/226 |
| 2008/0292196 | A1 * | 11/2008 | Jain et al. ....................... | 382/225 |
| 2011/0268316 | A1 * | 11/2011 | Bronder et al. ............... | 382/103 |

OTHER PUBLICATIONS

Chang Huang et al.. "Vector Boosting for Rotation Invariant Mullti-View Face Detection," Proc. 10th IEEE Int'l Conf. Computer Vision, 2005, 8 pages.
Rainer Lienhart et al., "A Detector Tree of Boosted Classifiers for Real-Time Object Detection and Tracking," Proceedings of the 2003 International Conference on Multimedia and Expo, vol. 1, 2003, 4 pages.
Zhiguang Yang et al., "Multi-View Face Pose Classification by Tree-Structured Classifier," IEEE International Conference on Image Processing, vol. 2, Sep. 2005, pp. 358-361.
Eng-Jon Ong et al., "A Boosted Classifier Tree for Hand Shape Detection," Face and Gesture Recognition, 2004, 6 pages.
Bo Wu et al., "Cluster Boosted Tree Classifier for Multi-View, Multi-Pose Object Detection," IEEE 11th International Conference on Computer Vision, Oct. 2007, pp. 1-8.
Antonio Torralba et al., "Sharing visual features for multiclass and multiview object detection," IEEE Transactions on Pattern Analysis and Machine Intelligence, vol. 29, No. 5, May 2007, 16 pages.
M. Jones et al., "Fast Multi-view Face Detection," Mitsubishi Electric Research Laboratories, TR2003-96, Aug. 2003, 10 pages.

* cited by examiner

*Primary Examiner* — Mike Rahmjoo
(74) *Attorney, Agent, or Firm* — Oblon, Spivak, McClelland, Maier & Neustadt, L.L.P.

(57) ABSTRACT

An information processing apparatus, which creates a tree structure used by a recognition apparatus which recognizes specific information using the tree structure, including a memory unit which stores data including the information to be recognized and data not including the information so as to correspond to a label showing whether or not the data includes the information, a recognition device which recognizes the information and outputs a high score value when the data including the information is input, and a grouping unit which performs grouping of the recognition devices using a score distribution obtained when the data is input into the recognition devices.

10 Claims, 19 Drawing Sheets

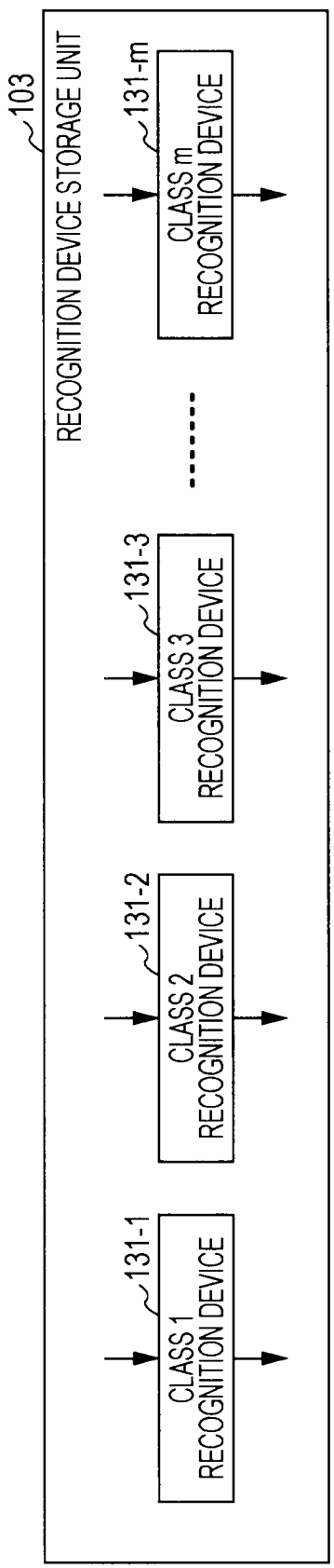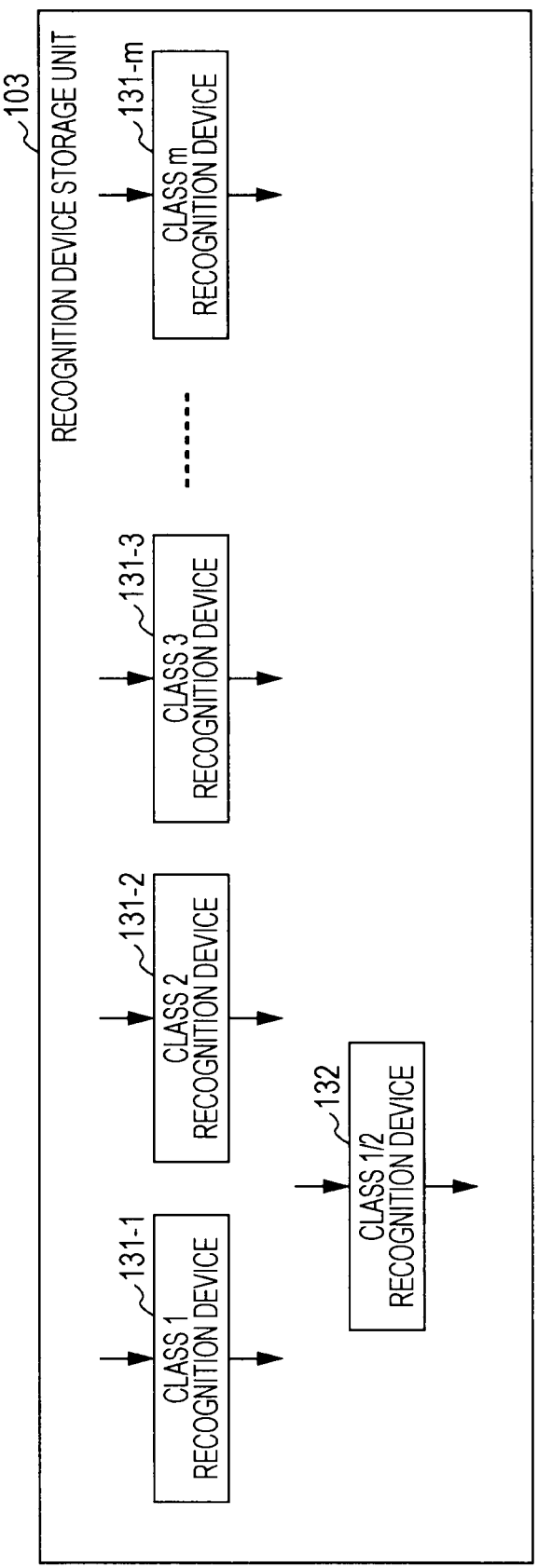

FIG. 8

| | X{Y==1} | X{Y==2} | ... | X{Y==m} |
|---|---|---|---|---|
| CLASS 1 RECOGNITION DEVICE | | | ... | |
| CLASS 2 RECOGNITION DEVICE | | | ... | |
| CLASS 3 RECOGNITION DEVICE | | | ... | |
| ... | ... | ... | ... | ... |
| CLASS m RECOGNITION DEVICE | | | ... | |

INFORMATION PROCESSING APPARATUS, METHOD AND PROGRAM

BACKGROUND OF THE INVENTION

1. Field of the Invention

The present invention relates to an information processing apparatus and method and a program, and in particular to, for example, an information processing apparatus, a method and a program preferable to use when recognizing an image of a specific object using a tree-structure recognition device from a specific image and preferable to use when appropriately creating the tree structure.

2. Description of the Related Art

When recognizing a target object that has many variations when looking from inside of an image, there is a method in the related art where an operation is split between a plurality of recognition devices. As one recognition technology of this type, an object recognition device which has a tree structure is being studied. In the field of facial recognition, recognition devices using tree structures designed by human beings are studied and it is described that faces are detected in "Vector Boosting for Rotation Invariant Multi-View Face Detection," C. Huang, H. Z. Ai, Y. Li and S. H. Lao Proc. 10$^{th}$ IEEE Int'l Conf. Computer Vision, 2005 (non-patent document 1); "A Detector Tree of Boosted Classifiers for Real-time Object Detection and Tracking," R. Lienhart, L. Liang, A. Kuranov, Proceedings of the 2003 International Conference on Multimedia and Expo—Volume 1 (non-patent document 2); "Multi-view Face Pose Classification by Tree-structured Classifier," Zhiguang Yang, Haizhou Ai, Okamoto T., Shihong Lao, Image Processing, 2005, ICIP 2005, IEEE International Conference on Volume 2, 11-14 Sep. 2005 Pages 11-358-61 (non-patent document 3); "A boosted Classifier Tree for Hand Shape Detection," E. J. Ong and R. Bowden, Face and Gesture Recognition, 2004 (non-patent document 4).

In order to make a tree structure for a person recognition device, a method is proposed in "Cluster Boosted Tree Classifier for Multi-View, Multi-Pose Object Detection," Bo Wu, Nevatia, R.ICCV 2007, IEEE 11$^{th}$ International Conference on Computer Vision, 14-21 Oct. 2007 pages 1-8 (non-patent document 5), where a tree structure is automatically constructed without an instructor using a WK (weak learner) characteristic. A method for a multi-view facial recognition device is proposed in "Sharing Visual Features for Multiclass and Multiview Object Detection," A. Torralba, K. P. Murphy and W. T. Freeman, IEEE Transactions on Pattern Analysis and Machine Intelligence, vol. 29, no. 5, pp. 854-869, May 2007 (non-patent document 6), and "Fast Multi-View Face Detection," M. Jones and P. Viola, MERLTR 2003-96, July 2003 (non-patent document 7), where a posture estimation device is input at an early stage and a normal recognition device is used after normalization by rotation.

SUMMARY OF THE INVENTION

In the above-mentioned non-patent documents 1 to 4, as the tree structure designed in advance by human beings is used, there is no guarantee that the tree structure is the optimal tree structure for recognition of faces and the like. In particular, in regard to objects such as people or hands where the shape varies significantly, it is difficult for human beings to design an optimal tree structure.

According to the non-patent document 5, it is appropriate for making a hand recognition device. However, in general, there is demand for not just being able to recognize a "hand" but also to recognize a shape of a hand (such as in a rock-paper-scissors game) and a posture (degree of rotation), and a demand of this type is not able to be met.

In the non-patent documents 6 and 7, it is thought that an image, which has been normalized by choosing one dictionary out of a plurality of dictionaries or using one dictionary, is processed without a tree structure. However, it is not able to be applied to recognizing a target object which is not able to be expressed just by rotation such as an object which changes shape such as a person or a hand as a recognition target.

It is desirable to be able to create an appropriate tree structure and perform recognition using the created tree structure.

According to an embodiment of the present invention, in an information processing device which creates a tree structure used by a recognition apparatus which recognizes specific information using the tree structure, there is provided a memory unit which stores data including the information to be recognized and data not including the information so as to correspond to a label showing whether or not the data includes the information, a recognition device which is a recognition device which recognizes the information and outputs a high score value when the data including the information is input, and a grouping unit which performs grouping of the recognition devices using a score distribution obtained when the data is input into the recognition devices.

The grouping unit may calculate a distance of the score distribution and perform grouping of the recognition devices with close distances.

The grouping unit may calculate a distance of the score distribution and perform grouping by clustering the distances.

The recognition device may be a discrimination device which has learned in advance.

The calculation of the score distribution distance may use a chi-squared distance.

The calculation of the score distribution distance may use KL-divergence.

The clustering may use spectral clustering.

The information may be a specific object or a specific voice, and the data may be image data, video data or voice data.

According to another embodiment of the present invention, there is provided an information processing method of an information processing apparatus, which is an information processing apparatus which creates a tree structure used by a recognition apparatus which recognizes specific information using the tree structure, and which at least is provided with a memory unit which stores data including the information to be recognized and data not including the information so as to correspond to a label showing whether or not the data includes the information, including performing grouping of recognition devices using a score distribution obtained when the data read from the memory unit is input into the recognition devices which are recognition devices which recognize the information and which output a high score value when the data including the information is input.

According to still another embodiment of the present invention, there is provided an information processing apparatus which is an information processing apparatus, which creates a tree structure used by a recognition apparatus which recognizes specific information using the tree structure, and which at least is provided with a memory unit which stores data including the information to be recognized and data not including the information so as to correspond to a label showing whether or not the data includes the information, including a computer-readable program which executes processing including performing grouping of recognition devices using a score distribution obtained when the data read from the memory unit is input into the recognition devices which are recognition devices which recognize the information and which output a high score value when the data including the information is input.

According to the embodiments of the invention, a tree structure is created using a recognition apparatus which recognizes specific information using a tree structure. The creating uses a recognition device which is a recognition device which stores data including the information to be recognized and data not including the information so as to correspond to a label showing whether or not the data includes the information and recognizes the information, and which outputs a high score value when the data including the information is input. The method is performed by performing grouping of recognition devices using a score distribution obtained when the data is input into the recognition devices.

According to the embodiments of the invention, it is possible to create a tree structure which is appropriate for objects or voices which are the target to be recognized. Also, it is possible to recognize specific objects or voices by performing recognition based on the created tree structure.

BRIEF DESCRIPTION OF THE DRAWINGS

FIGS. 7A and 7B are diagrams for describing a recognition device stored in a recognition device memory unit.

FIG. 8 is a diagram for describing a table relating to a score.

DESCRIPTION OF THE PREFERRED EMBODIMENTS

Embodiments of the invention will now be described with reference to the diagrams.
Tree Structure According to the embodiments of the invention, in the case when a recognition device, when recognizing information such as specific objects or voices from input data such as a specific image, video or voice, is a tree-structure recognition device, it is possible for the tree structure to be a tree structure which is appropriate for the recognition target. The tree structure will be described. Here, a case when a hand is recognized from a specific image is used as an example and described. Also, a case when the shape of the hand is three shapes used in a rock-paper-scissors game, rock (a state where all fingers are closed), scissors (a state where two fingers are open and the remaining three fingers are closed) and paper (a state where all fingers are open), is used as an example and described. Also, in the description below, a case where not only is the shape of the hand recognized but the inclination of the hand is also recognized is used as an example and described.

Figure 1:
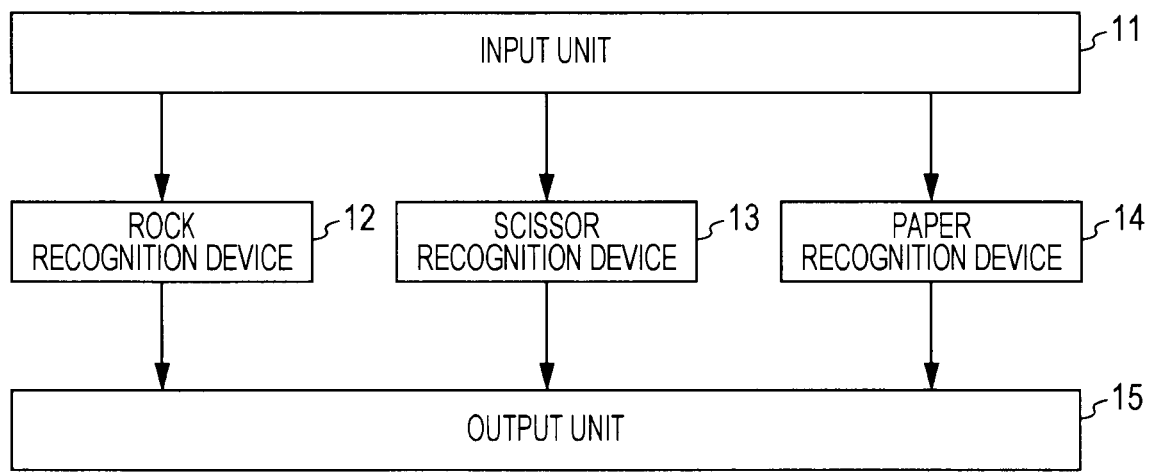
FIG. 1 is a diagram illustrating an example of a configuration of a recognition apparatus of the related art.

FIG. 1 is a diagram illustrating a configuration of an apparatus which recognizes an image of a hand (a portion of a hand) from a specific image using a tree structure. The recognition apparatus shown in FIG. 1 is configured from an input unit 11, a rock recognition device 12, a scissors recognition device 13, a paper recognition device 14 and an output unit 15. The input unit 11 inputs an image which is a processing target and outputs it to each of the rock recognition device 12, the scissors recognition device 13 and the paper recognition device 14.

The rock recognition device 12 is a recognition device which outputs a high score when the shape of the hand, in particular a rock shape, is recognized from the input image. In the same manner, the scissors recognition device 13 is a recognition device which outputs a high score when a scissor shape is recognized from the input image, and the paper recognition device 14 is a recognition device which outputs a high score when a paper shape is recognized from the input image.

The output unit 15 adopts the shape of the hand, which is recognized by the recognition device which outputs the highest score from among the scores calculated by each of the rock recognition device 12, the scissors recognition device 13 and the paper recognition device 14, as the shape of the hand captured in the input image. For example, in the case when the value of the score from the rock recognition device 12 is the highest value, the output unit 15 outputs a conclusion that the shape of the hand is a rock.

Figure 2:
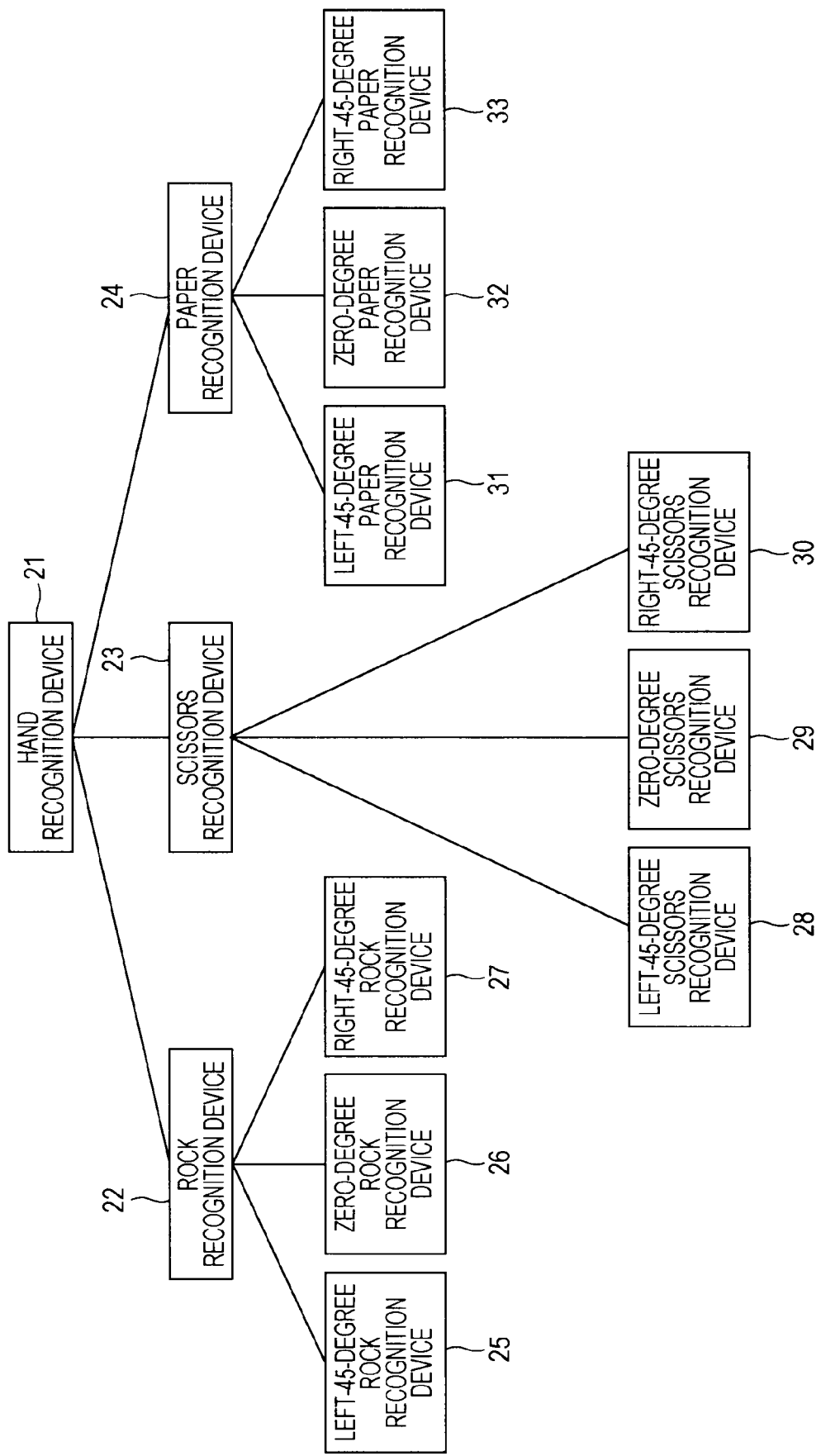
FIG. 2 is a diagram illustrating an example of a tree structure.

In this manner, while it may be sufficient to perform recognition by providing a specialized recognition device to recognize the specific shape of the hand, it is considered that, in order to effectively perform recognition, a final hand shape or inclination is recognized using a tree structure shown in FIG. 2. The tree structure shown in FIG. 2 is a configuration when either a left hand or a right hand is recognized, and another tree structure, which has the same configuration as the tree structure in FIG. 2, is necessary to recognize both the left hand and the right hand.

The recognition apparatus shown in FIG. 2 is configured from a hand recognition device 21, a rock recognition device 22, a scissors recognition device 23, a paper recognition device 24, a left-45-degree rock recognition device 25, a zero-degree rock recognition device 26, a right-45-degree rock recognition device 27, a left-45-degree scissors recognition device 28, a zero-degree scissors recognition device 29, a right-45-degree scissors recognition device 30, a left-45-degree paper recognition device 31, a zero-degree paper recognition device 32, and a right-45-degree paper recognition device 33.

Figure 3:
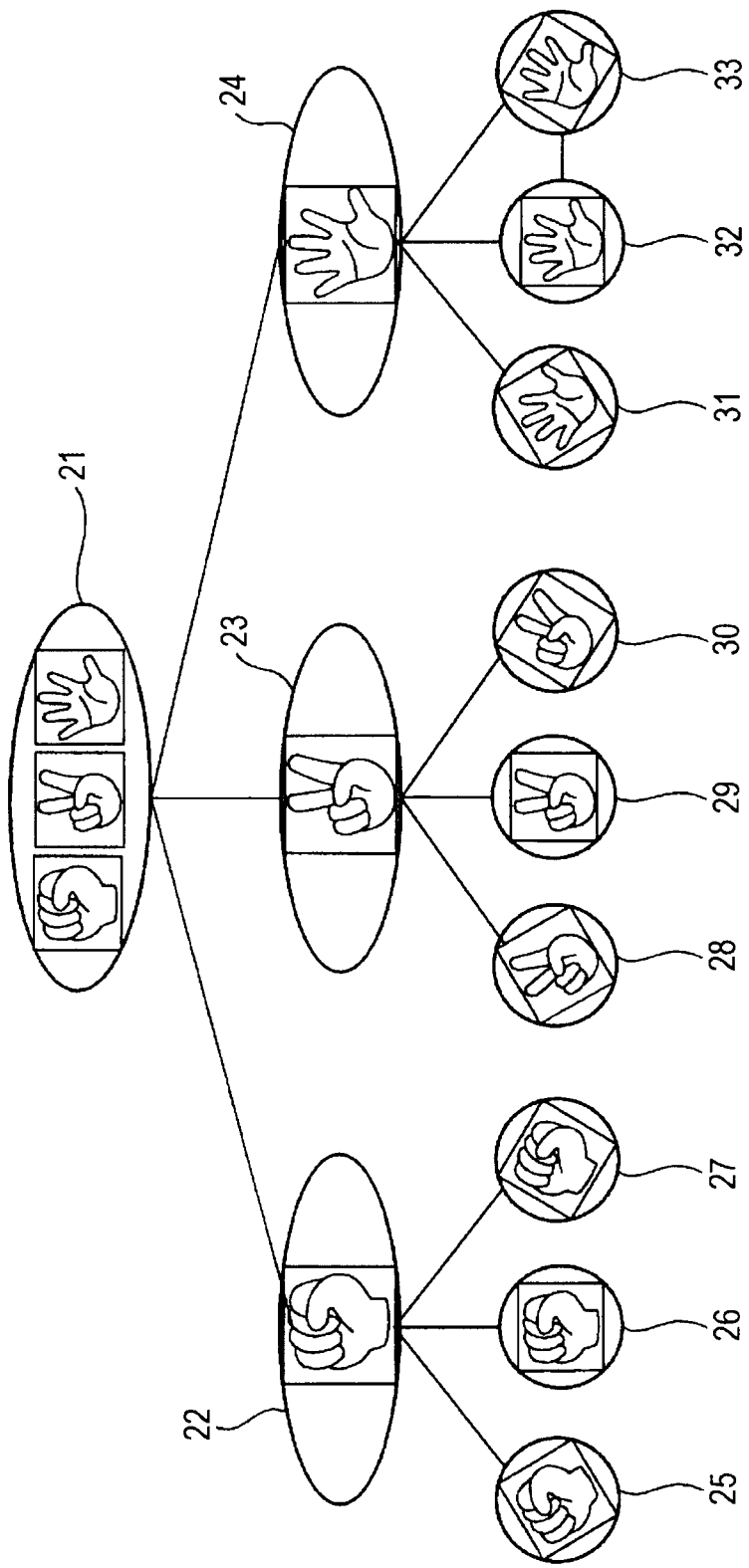
FIG. 3 is a diagram illustrating an example of a tree structure.

FIG. 3 is a diagram illustrating as illustrations the shape of the hand and inclination of the hand recognized by each of the recognition devices of the recognition apparatus shown in FIG. 2. Description will be continued below while referring to FIGS. 2 and 3. In the hand recognition device 21, an image which is a processing target is input from an input unit (not shown). The hand recognition device 21 is a recognition device which outputs a high score when an image of a hand is captured including when an image of a hand in a rock, scissor, or paper shape is captured in the input image. As such, in the case that the score output from the hand recognition device 21 is equal to or lower than a predetermined threshold, it is possible that it is configured so that the later stage of processing may not be performed as a hand is not captured in the image which is the processing target. By doing this, it is possible to achieve an improvement in processing speed and the like.

When it is determined that the image from the hand recognition device 21 captures a hand, the image which is the processing target is supplied to each of the rock recognition device 22, the scissors recognition device 23 and the paper recognition device 24. The rock recognition device 22, the scissors recognition device 23 and the paper recognition device 24 are recognition devices which respectively recognize a rock, a scissor and a paper but are recognition devices which do not perform recognition of an inclination. Each of the rock recognition device 22, the scissors recognition device 23 and the paper recognition device 24 perform score calculation. It may be set so that only the recognition device with the highest score performs the later stage of processing, and by doing this, it is possible to achieve an improvement in processing speed and the like.

For example, in the case when the score of the rock recognition device 22 is a higher value than the score of the scissor recognition device 23 and the score of the paper recognition device 24, the processing target image is supplied only from the rock recognition device 22 to the left-45-degree rock recognition device 25, the zero-degree rock recognition device 26 and the right-45-degree rock recognition device 27 in the later stage. Then, processing is performed by each of the recognition devices of the left-45-degree rock recognition device 25, the zero-degree rock recognition device 26 and the right-45-degree rock recognition device 27.

The left-45-degree rock recognition device 25 is a recognition device which recognizes a rock inclined to the left by 45 degrees. The zero-degree rock recognition device 26 is a recognition device which recognizes a rock inclined by zero degrees (not inclined). The right-45-degree rock recognition device 27 is a recognition device which recognizes a rock inclined to the right by 45 degrees. In the same manner, the left-45-degree scissor recognition device 28 is a recognition device which recognizes a scissor inclined to the left by 45 degrees. The zero-degree scissor recognition device 29 is a recognition device which recognizes a scissor inclined by zero degrees (not inclined). The right-45-degree scissor recognition device 30 is a recognition device which recognizes a scissor inclined to the right by 45 degrees. In the same manner, the left-45-degree paper recognition device 31 is a recognition device which recognizes a paper inclined to the left by 45 degrees. The zero-degree paper recognition device 32 is a recognition device which recognizes a paper inclined by zero degrees (not inclined). The right-45-degree paper recognition device 33 is a recognition device which recognizes a paper inclined to the right by 45 degrees.

The shape of the hand, which is recognized by the recognition device which outputs the highest score from among each of the recognition devices, is adopted as the shape of the hand captured in the input image.

The tree structures shown in FIGS. 2 and 3 were created by human beings in the related art. The tree structure, such as that which divides into each of rock, scissors and paper such as the tree structure shown in FIG. 3, is considered to most effectively perform the recognition and is an example of the tree structure created in this manner. However, when the recognition apparatus recognizes rock, scissors or paper, it is not limited to the tree structure shown in FIG. 3 being able to recognize most effectively. For example, the tree structure such as that shown in FIG. 4 may be the tree structure for which it is easier to perform recognition.

Description will be made with reference to FIG. 4. The tree structure shown in FIG. 4 firstly has a hand recognition device 61 which recognizes whether or not it is a hand. In the case when the hand recognition device 61 determines that it is an image of a hand, the processing target image is supplied to a paper recognition device 62 and a rock/scissor recognition device 63. That is, in the case of the tree structure shown in FIG. 4, there is not a recognition device which recognizes each of rock, scissors and paper but a recognition device which recognizes paper and a recognition device that recognizes everything else (scissors and rock).

For example, while rock and scissors have in common that rock is a state where all fingers are closed and scissors is a state where three fingers are closed, paper is a state where all fingers are open and has nothing in common with rock. As such, the tree structure includes the rock/scissors recognition device 63 which recognizes rock and scissors together which have common points and the paper recognition device 62 which recognizes only paper which has no common points.

Furthermore, as later stage recognition devices, the paper recognition device 62 has a left-45-degree paper recognition device 64 which recognizes a left-45-degree paper and a zero-degree/right-45-degree paper recognition device 65 which recognizes either a zero-degree paper or a right-45-degree paper. In addition, as later stage recognition devices, the zero-degree/right-45-degree paper recognition device 65 has a zero-degree paper recognition device 71 which recognizes a zero-degree paper and a right-45-degree paper recognition device 72 which recognizes a right-45-degree paper.

The rock/scissors recognition device 63 has a left-45-degree scissor recognition device 66 which recognizes a left-45-degree scissor, a right-45-degree scissor recognition device 67 which recognizes a right-45-degree scissor, a left-45-degree rock recognition device 68 which recognizes a left-45-degree rock, a zero-degree rock/scissor recognition device 69 which recognizes either a zero-degree scissor and a zero-degree rock, and a right-45-degree rock recognition device 70 which recognizes a right-45-degree rock. In addition, the zero-degree rock/scissor recognition device 69 has a zero-degree scissor recognition device 73 which recognizes a zero-degree scissor and a zero-degree rock recognition device 74 which recognizes a zero-degree rock.

Figure 4:
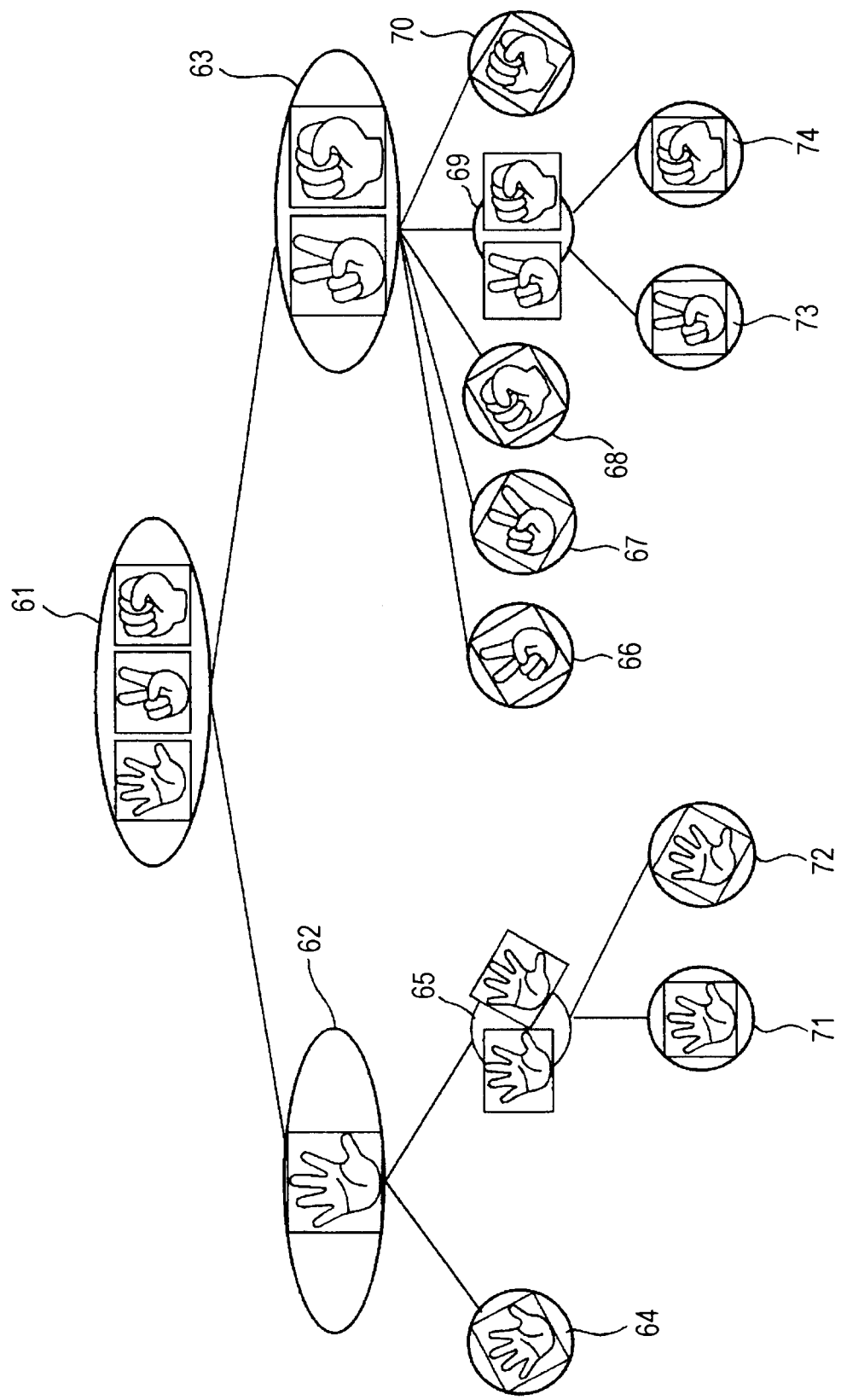
FIG. 4 is a diagram illustrating an example of a tree structure.

Here, the tree structure shown in FIG. 3 and the tree structure shown in FIG. 4 will be compared. In each of the diagrams, comparison will be performed by introducing a concept of a first layer, a second layer, a third layer and a fourth layer from the top side in the diagrams.

The first layer of the tree structure of FIG. 3 includes the hand recognition device 21. The second layer of the tree structure of FIG. 3 includes the rock recognition device 22, the scissors recognition device 23 and the paper recognition device 24. The third layer of the tree structure of FIG. 3 includes the left-45-degree rock recognition device 25, the zero-degree rock recognition device 26, the right-45-degree rock recognition device 27, the left-45-degree scissors recognition device 28, the zero-degree scissors recognition device 29, the right-45-degree scissors recognition device 30, the left-45-degree paper recognition device 31, the zero-degree paper recognition device 32, and the right-45-degree paper recognition device 33. As such, the tree structure shown in FIG. 3 is a three layer structure.

The first layer of the tree structure of FIG. 4 includes the hand recognition device 61. The second layer of the tree structure of FIG. 4 includes the paper recognition device 62 and the rock/scissor recognition device 63. The third layer of the tree structure of FIG. 4 includes the left-45-degree paper recognition device 64, the zero-degree/right-45-degree paper recognition device 65, the left-45-degree scissor recognition device 66, the right-45-degree scissor recognition device 67, the left-45-degree rock recognition device 68, the zero-degree rock/scissor recognition device 69, and the right-45-degree rock recognition device 70. The fourth layer of the tree structure of FIG. 4 includes the zero-degree paper recognition device 71, the right-45-degree paper recognition device 72, the zero-degree scissor recognition device 73 and the zero-degree rock recognition device 74. As such, the tree structure shown in FIG. 4 is a four layer structure.

In this manner, compared to the tree structure shown in FIG. 3, firstly, the tree structure shown in FIG. 4 is different in that it is a structure with one more layer. Here, the second layers will be compared. The second layer of the tree structure shown in FIG. 3 is configured from the rock recognition device 22, the scissors recognition device 23 and the paper recognition device 24 which recognize each of rock, scissors and paper, while the second layer of the tree structure of FIG. 4 is configured from the paper recognition device 62 and the rock/scissor recognition device 63, so that the rock/scissor recognition device 63 which recognizes either rock or scissors is different.

As described above, since rock and scissors have common points, there is a possibility that the tree structure provided with the recognition device which recognizes rock and scissors such as the tree structure shown in FIG. 4 is able to more effectively perform recognition to obtain a final recognition result compared to the tree structure provided with each of the recognition device which recognizes rock and the recognition device which recognizes scissors such as the tree structure shown in FIG. 3. In other words, there is a possibility that the tree structure shown in FIG. 4 is the tree structure that is more appropriate for effectively performing recognition compared to the tree structure shown in FIG. 3. It is possible to say the same also for the third layer and the fourth layer.

However, when focusing on paper and scissors, there is commonality in that paper is when all fingers are open while scissors is when two fingers are open. On the other hand, it is possible to say that rock has no common points with paper and scissors as all fingers are closed. As such, in the tree structure shown in FIG. 4, a configuration including a recognition device which recognizes paper and scissors (described here as a paper/scissor recognition device 62') and a rock recognition device which recognizes rock (described here as a rock recognition device 63') may be considered.

In the second layer of the tree structure of FIG. 4, it is possible to confirm whether or not the tree structure with the configuration including the paper recognition device 62 and the rock/scissor recognition device 63 is able to perform the recognition processing more effectively than the tree structure with the configuration including the paper/scissor recognition device 62' and the rock recognition device 63' by actually creating the tree structures and performing the recognition processing. However, the confirming is difficult and it is considered that operational efficiency is bad.

In other words, it is possible to consider various tree structures such as the tree structure shown in FIG. 3, the tree structure shown in FIG. 4, and the tree structure which is not shown but which is an improvement on the tree structure of FIG. 4. It is considered that it is a difficult operation for human beings to think up all of the possible tree structures to be considered and confirm which tree structure is able to most effectively perform recognition processing.

Thus, a method for creating a tree structure which is able to effectively perform recognition processing where people are saved hassle as much as possible is described below.

Creating Tree Structures

A tree structure used by a recognition device which recognizes 9 types of hands, a rock with a left-45-degree inclination, a rock with no inclination, a rock with a right-45-degree inclination, a scissor with a left-45-degree inclination, a scissor with no inclination, a scissor with a right-45-degree inclination, a paper with a left-45-degree inclination, a paper with no inclination, and a paper with a right-45-degree inclination, as described above, is used as an example and described.

Here, in the description below, an apparatus which performs recognition using a tree structure is referred to as a recognition apparatus and a node configuring a tree structure is referred to as a recognition device. Also, there is reference to the recognition device, but in recognition, the meanings of detection, distinction and determination are included. In other words, for example, recognizing a specific object from a specific image includes the meanings of detecting the specific object from the specific image, distinguishing the specific object in the specific image and determining whether or not the specific object exists in the specific image.

For example, the tree structure shown in FIG. 3 and the tree structure sown in FIG. 4 may be considered as the tree structure for recognizing the 9 types of hands. When creating the tree structure, as described with reference to FIG. 4, for example, whether to create the rock/scissor recognition device 63 which recognizes rock and scissors together or to create the paper/scissor recognition device 62' which recognizes paper and scissors together is determined by executing the processing such as that below.

To describe more generally, there is a possibility that similar patterns (shapes) are able to be recognized using similar characteristic amounts. If it is possible to recognize similar patterns together using similar characteristic amounts, it is considered that it is possible to perform effective recognition. As such, a shape which is able to be recognized using similar characteristic amounts is recognized by the same recognition device, and the creation of the tree structure used by a recognition apparatus which recognizes a plurality of shapes to be finally recognized is possible by executing the processing such as that below.

Here, being able to recognize similar patterns together using similar characteristic amounts has the meaning that, for example, if the rock recognition device and the scissor recognition device are close, it is possible to create recognition device which recognizes rock and scissors. If it is possible to determine that recognition devices are close, the recognition devices are able to be grouped together and it is possible to create a tree structure by repeating this.

In order to determine that the recognition devices are close, determination by performing the processing such as that below is considered.

Method 1: Examine properties when same problem was solved

Method 2: Examine closeness to WL (weak learner)

Method 3: Examine closeness to filter characteristics with WL

Method 2 and method 3 are possible using techniques in the related art. For example, method 2 is possible using techniques such as CBT and AT. Also, method 3 is possible using techniques such as fillip and AT.

Figure 5:
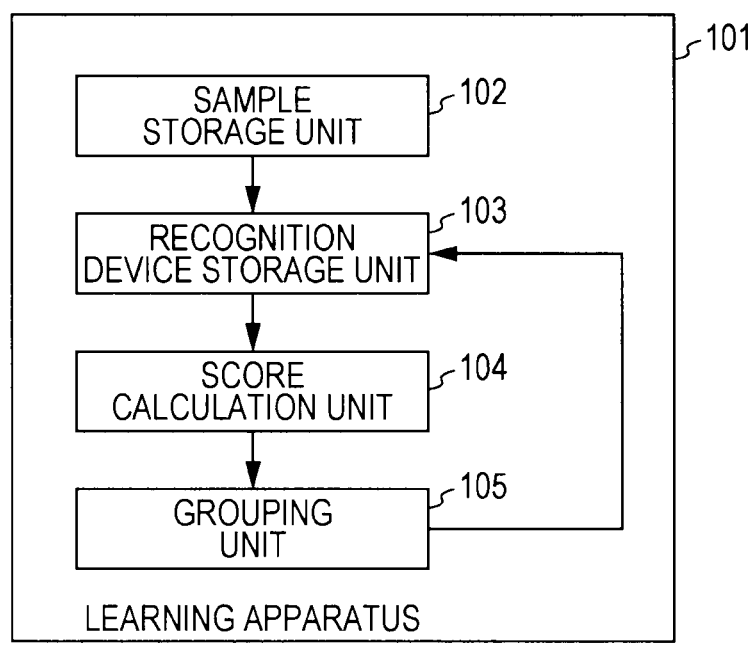
FIG. 5 is a diagram illustrating an example of a configuration of a learning apparatus according to the embodiment of invention.

Here, a method where it is determined that recognition devices are close by using method 1 and a tree structure is created will be described. FIG. 5 is a diagram illustrating a configuration of an embodiment of a learning apparatus which creates (learns) tree structures. The learning apparatus 101 shown in FIG. 5 is configured to include a sample memory unit 102, a recognition device memory unit 103, a score calculation unit 104 and a grouping unit 105.

In the sample memory unit 102, a plurality of images used in learning is stored. Also, the images (sample images) have a label correspondingly attached and are stored in the sample memory unit 102. Description of the samples images and the labels stored in the sample memory unit 102 will be added with reference to FIG. 6.

In the sample memory unit 102, the sample images are classified into each shape to be recognized and stored. In an example shown in FIG. 6, classes 1 to m are provided and a plurality of the sample images is stored with a corresponding label attached for each of the classes. For example, the sample images classified as class 1 are images showing a hand in a rock shape, the sample images classified as class 2 are images showing a hand in a scissor shape, the sample images classified as class 3 are images showing a hand in a paper shape, and the sample images classified as class m are nature images. Below, the specific example of images such as these being classified into each class will continue to be described.

In the case when a specific recognition device (referred to here as a recognition device A) is a recognition device which recognizes rock, the sample images included in class 1 are positive images to recognition device A but the sample images other than class 1 such as the sample images included in class 2 and class 3 are negative images. In this manner, classification is performed so that, in regard to a specific recognition device, an image is a positive image but is a negative image in regard to another recognition device. Classification of images is performed using the concept of classes and the images are stored in the sample memory unit 102.

Figure 6:
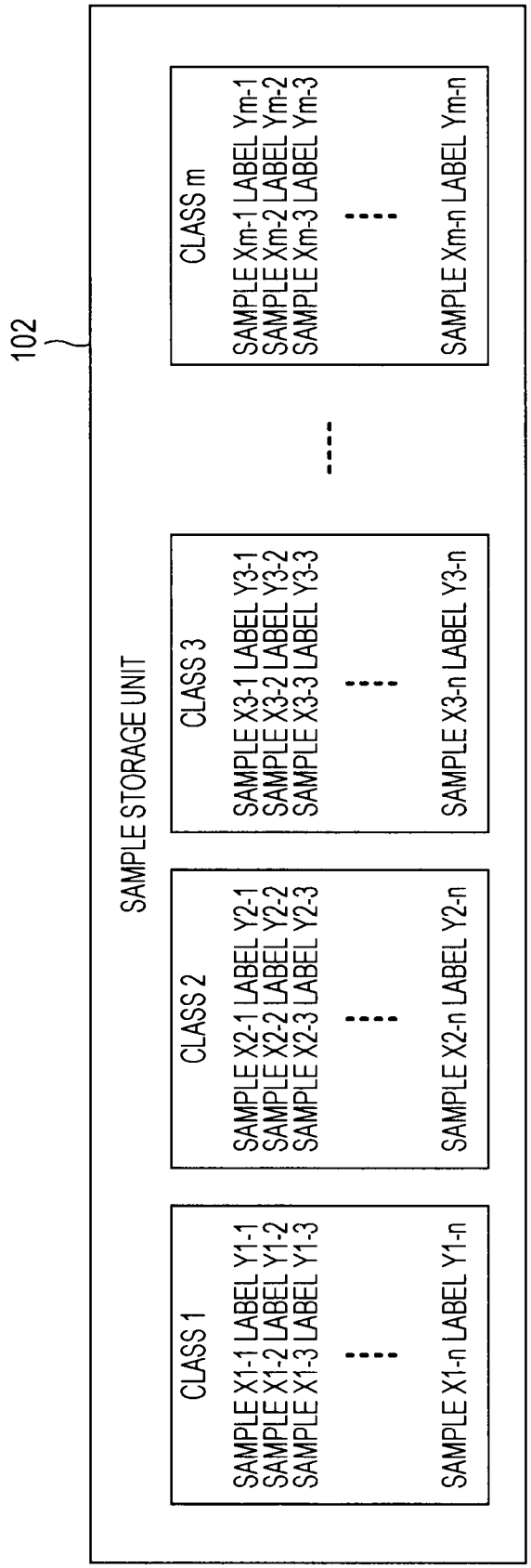
FIG. 6 is a diagram for describing data stored in a sample memory unit.

Also, referring to FIG. 6, for example, in class 1, sample X1-1 is stored with label Y1-1 correspondingly attached, sample X1-2 is stored with label Y1-2 correspondingly attached, sample X1-3 is stored with label Y1-3 correspondingly attached, . . . , and sample X1-n is stored with label Y1-n correspondingly attached. Sample X represents sample images and label Y represents the label of the sample images. For example, in the case such as the example described above, since class 1 is a class including the images showing a hand in a rock shape, the sample images X1-1 to X1-n are the sample images showing a hand in a rock shape, and the labels Y1-1 to Y1-n are labels "rock".

In this manner, in the sample memory unit 102, the sample images of objects to be recognized, for example in this case each hand shape, are each classified into classes and stored with a label correspondingly attached.

Returning to the learning apparatus 101 of FIG. 5, the recognition device memory unit 103 stored the recognition device of each of the classes. Since the recognition devices stored in the recognition device memory unit 103 are grouped and updated by performing learning, even if there are recognition devices for each class in the initial state, the configuration and the number of recognition devices may change due to learning being repeated.

Referring to FIG. 7, the recognition devices stored in the recognition device memory unit 103 will be described. FIG. 7A is a diagram illustrating the recognition devices stored when the recognition device memory unit 103 is in its initial state. In the recognition device memory unit 103, a class 1 recognition device 131-1, a class 2 recognition device 131-2, a class 3 recognition device 131-3, . . . , and a class m recognition device 131-m are stored. It is possible to configure the recognition devices as 2-class distinction devices.

For example, the class 1 recognition device 131-1 is a recognition device which outputs a determination result "true" when an image showing a hand in a rock shape is input, and outputs a determination result "false" when an image not showing a hand in a rock shape is input. That is, it is possible to configure the class 1 recognition device 131-1 as a 2-class distinction device which determines whether or not the image which is a processing target shows a rock and outputs the determination result as two values, "true" or "false". The other recognition devices are the same.

The class 1 recognition device 131-1 is a recognition device which outputs a determination result "true" when a sample image classified into class 1 is input, the class 2 recognition device 131-2 is a recognition device which outputs a determination result "true" when a sample image classified into class 2 is input, the class 3 recognition device 131-3 is a recognition device which outputs a determination result "true" when a sample image classified into class 3 is input, . . . , and the class m recognition device 131-m is a recognition device which outputs a determination result "true" when a sample image classified into class m is input.

Here, it is described that classes are set to class m and also the recognition devices are set to the class m recognition device 131-m. However, it is not necessary for the number of classes and the number of recognition devices to match. The number of classes may be more than the number of recognition devices. For example, in the case when there is a class including an image which is not desired to be recognized, the recognition device for the class is not stored in the recognition device memory unit 103.

Each recognition device may be stored in the recognition device memory unit 103 having learnt using images of classes corresponding in advance to output "true" when an image to be included in the class is input and output "false" when other images are input, or the learning itself may be performed in the learning apparatus 101 and the result of the learning may be stored in the recognition device memory unit 103.

The details will be described later, but in this manner, it is possible to expect the effect that, by performing the processing using the recognition devices which have learnt in advance, any recognition device is able to be used as the recognition devices. This means that any recognition device may be used as well as the recognition devices represented by boosting and the like.

FIG. 7B shows an example of the case when learning is performed by the learning apparatus when a recognition device similar to that shown in FIG. 7A is in a state of being stored in the recognition device memory unit 103, and the recognition device stored in the recognition device memory unit 103 is updated to reflect the results of the learning. In the case that it is determined that it is better if the results of the learning and the images included in each of class 1 and class 2 are recognized by the same recognition device and it is possible for the classes to be group together in the same recognition device and the like, the class 1 recognition device 131-1 and the class 2 recognition device 131-2 (FIG. 7A) may be grouped together to create a class 1 and 2 recognition device 132 (FIG. 7B). The class 1 and 2 recognition device 132 is a recognition device which outputs a determination result "true" when an image included in each of class 1 and class 2 is input.

If further learning is performed in the state where the recognition devices shown in FIG. 7B are stored in the recognition device memory unit 103, although not shown, there is a possibility that recognition devices corresponding to a plurality of classes is created. Also, a tree structure is formed by repetition of such learning.

For example, the determination of whether or not to create the class 1 and 2 recognition device 132 which groups together the class 1 recognition device 131-1 and the class 2 recognition device 131-2 as described above and corresponds to class 1 and class 2, or in other words, the determination to create the class 1 and 2 recognition device 132 which groups the class 1 recognition device 131-1 and the class 2 recognition device 131-2 and corresponds to class 1 and class 2, is performed according to a result of a score calculation of the score calculation unit 104 (FIG. 5).

The score calculation unit 104 calculates a score from the output from each of the recognition devices, and for example, creates a table such as that shown in FIG. 8. Here, creation of the table is described, but it does not mean that a table similar to the table shown in FIG. 8 is necessarily created, and it is sufficient if it is a data format such that it is able to be used when grouping (clustering) processing described later is executed. Here, for convenience of description, description will continue with the table shown in FIG. 8 being created.

The table shown in FIG. 8 is a table with the recognition devices (the names thereof), which are stored in the recognition device memory unit 103 at the point in time when the table is created, arranged in the vertical axis, and the classes (the name of the classes), which are the processing targets of the recognition devices at the point in time when the table is created, arranged in the horizontal axis.

In the table shown in FIG. 8, the score value when an image X{Y==1} included in class 1 was input into the class 1 recognition device 131-1 is the score written into the cell at the intersecting of "class 1 recognition device 131-1" and "image X{Y==1}". In the case that, for example, 1000 sample images are included in class 1, this score is a graph of the score obtained from the 1000 sample images. Also, referring to the table shown in FIG. 8, since the "class 1 recognition device 131-1" outputs the determination result "true" when the sample image included in class 1 is processed (since a high score value is output), the score written into the cell at the intersecting of "class 1 recognition device 131-1" and "image X{Y==1}" is a high value.

The score value when an image X{Y==2} included in class 2 was input into the class 1 recognition device 131-1 is the score written into the cell at the intersecting of "class 1 recognition device 131-1" and "image X{Y==2}". The score value when an image X{Y==m} included in class m was input into the class 1 recognition device 131-1 is the score written into the cell at the intersecting of "class 1 recognition device 131-1" and "image X{Y==m}". In this manner, the sample images included in each class from class 1 to class m are each input into the class 1 recognition device 131-1, and the scores of each of the classes is written into the corresponding cells of the table.

In this manner, when learning, by all the images included in each of the classes being input and processed in regard to one recognition device and such processing being performed with regard to all recognition devices, a table such as that shown in FIG. 8 is obtained. From a table such as this, it is possible to perform grouping (clustering) using the similarity of the score distributions and the like. The grouping is performed by the grouping unit 105 (FIG. 5).

The grouping unit 105 (FIG. 5) refers to the calculation result (in a table such to that shown in FIG. 8) from the score calculation unit 104, groups the recognition devices which have, for example, similar score distributions into a single recognition device, and creates the single recognition device corresponding to a plurality of classes. Using the result of the grouping of the grouping unit 105 and the processing of a single grouping, a single recognition device may be newly created or a plurality of recognition devices may be newly created.

Creation Processing of Tree Structure

Figure 9:
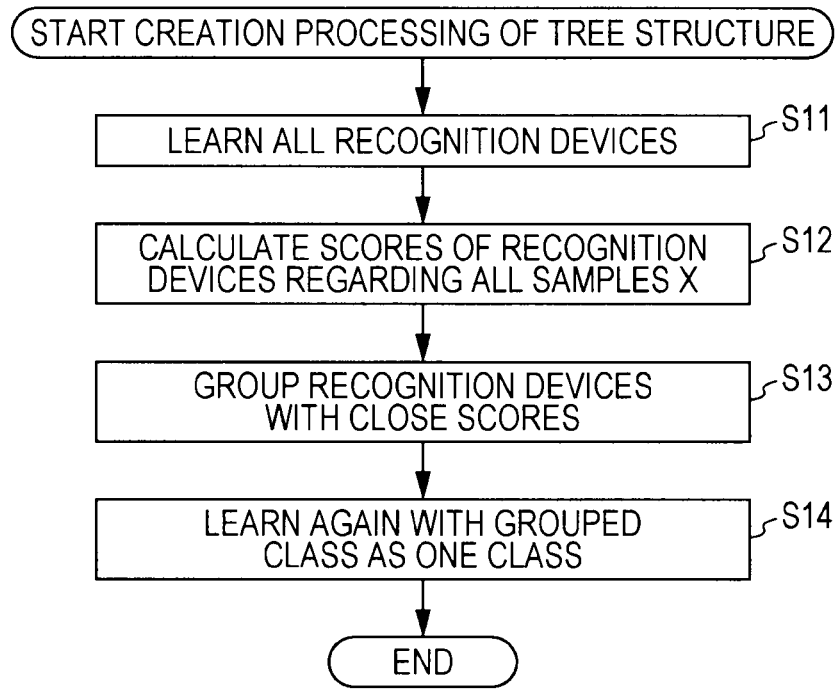
FIG. 9 is a flow chart for describing a creating process of a tree structure.

The processing of the learning apparatus 101 shown in FIG. 5, that is, the creation processing of a tree structure will be further described with reference to a flowchart shown in FIG. 9.

In step S11, the recognition device memory unit 103 learns all of the recognition devices using all of the sample images stored in the sample memory unit 102. The processing executed in step S11 is performed as described with reference to FIGS. 6 and 7. Then, in step S12, the score of the recognition device is calculated with regard to all of the samples X by the score calculation unit 104. The processing executed in step S12 is performed as described with reference to FIG. 8.

Figure 10:
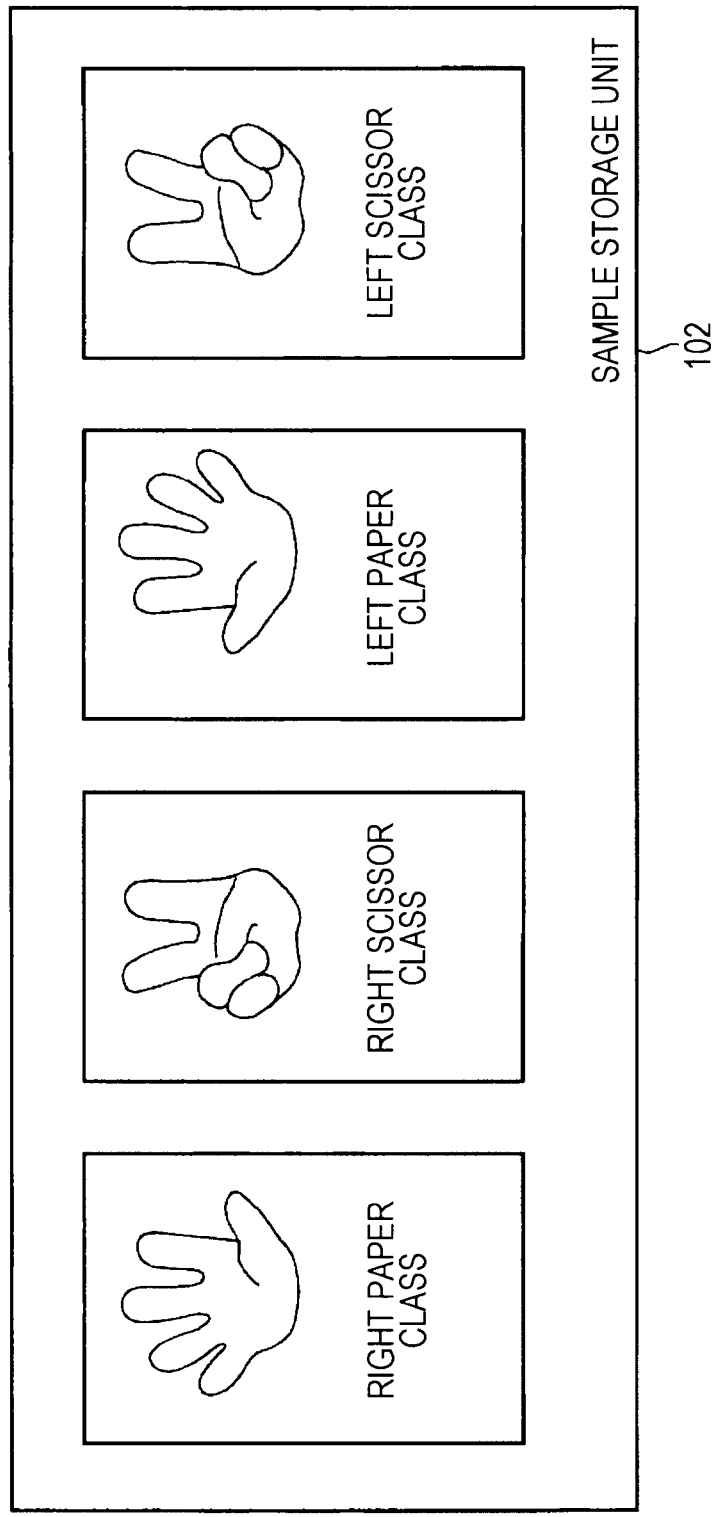
FIG. 10 is a diagram for describing a class.

Here, description will be added using a specific example. Here, as the specific example, the case when creating a tree structure used in a recognition device which recognizes four classes such as that shown in FIG. 10 will be described as an example. The four classes in FIG. 10 are the four classes of a right paper class, a right scissor class, a left paper class and a left scissor class. For each of the classes, for example, 1000 sample images are stored in the sample memory unit 102.

Figure 11:
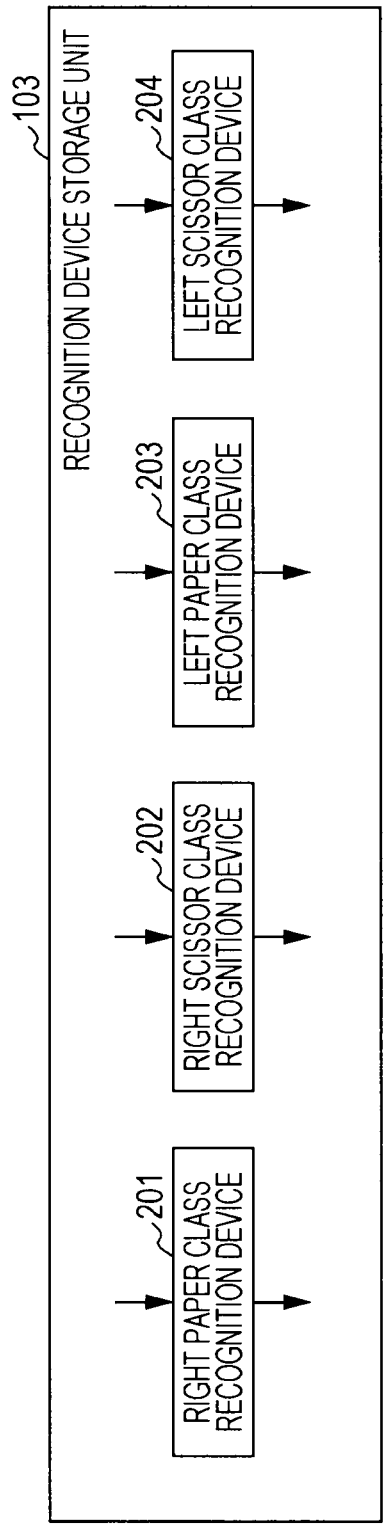
FIG. 11 is a diagram for describing a recognition device.

Also, the recognition devices which recognize each of the four classes are stored in the recognition device memory unit 103. For example, the recognition devices such as those shown in FIG. 11 are stored in the recognition device memory unit 103. That is, in the recognition device memory unit 103, a right paper class recognition device 201, a right scissor class recognition device 202, a left paper class recognition device 203 and a left scissor class recognition device 204 are stored.

In such a state, if the processing of step S11 is executed, first, the sample images included in the right paper class are input into the right paper class recognition device 201 and the score is calculated. In the same manner, the sample images included in the right scissor class, the sample images included in the left paper class and the sample images included in the left scissor class are sequentially input into the right paper class recognition device 201 and the score for each of the classes is calculated.

In the same manner, the sample images included in the right paper class, the sample images included in the right scissor class, the sample images included in the left paper class and the sample images included in the left scissor class are sequentially input into the right scissor class recognition device 202 and the score for each of the classes is calculated.

In the same manner, the sample images included in the right paper class, the sample images included in the right scissor class, the sample images included in the left paper class and the sample images included in the left scissor class are sequentially input into the left paper class recognition device 203 and the score for each of the classes is calculated.

In the same manner, the sample images included in the right paper class, the sample images included in the right scissor class, the sample images included in the left paper class and the sample images included in the left scissor class are sequentially input into the left scissor class recognition device 204 and the score for each of the classes is calculated.

Figure 12:
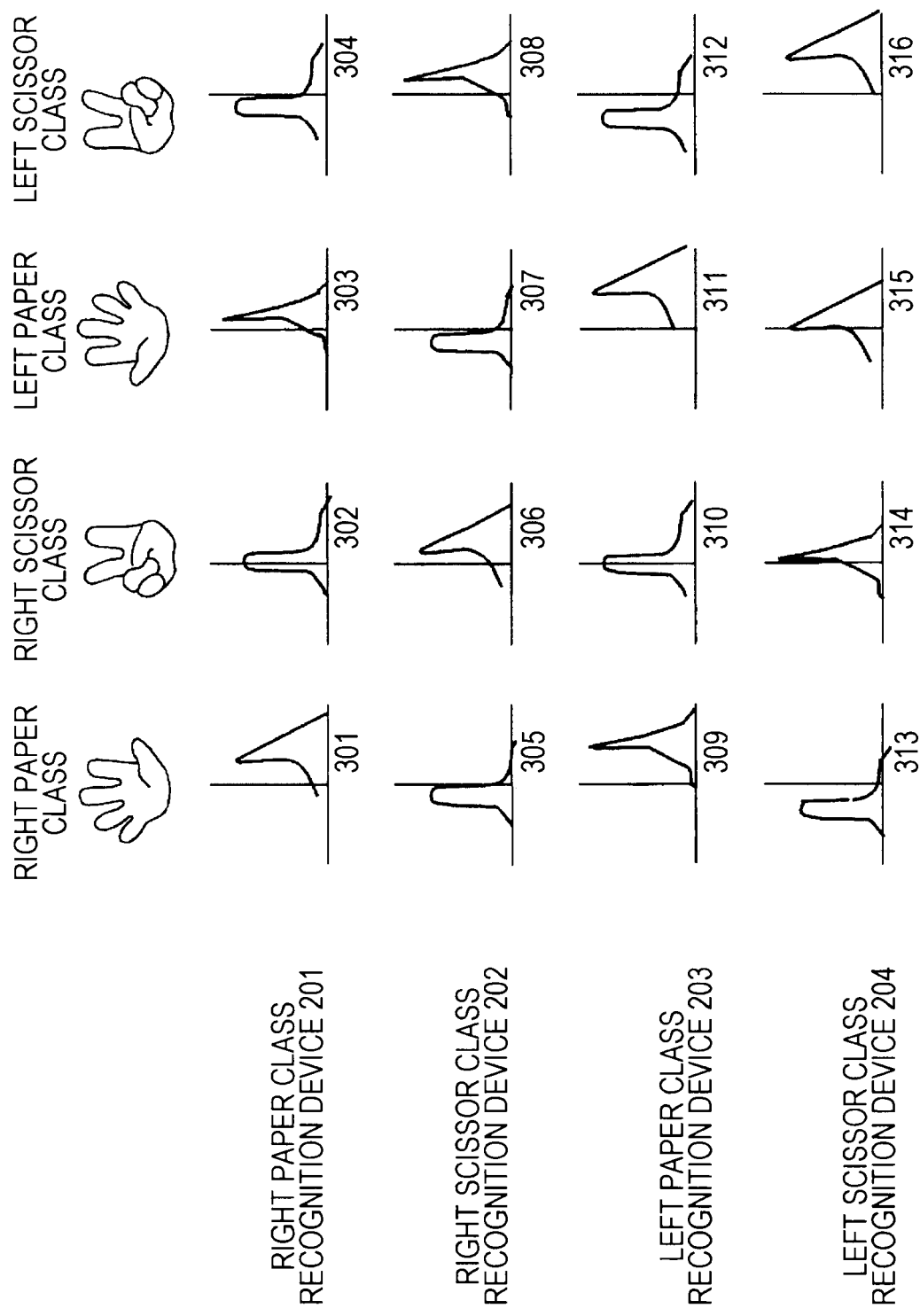
FIG. 12 is a diagram for describing a table relating to a score.

In this manner, the sample images of each of the classes is input into each of the recognition devices, and the scores of the recognition devices are calculated for each of the classes. From the results, it is possible to obtain, for example, a table such as that shown in FIG. 12. A score value 301 is the score value calculated when the sample images included in the right paper class are input into the right paper class recognition device 201, a score value 302 is the score value calculated when the sample images included in the right scissor class are input into the right paper class recognition device 201, a score value 303 is the score value calculated when the sample images included in the left paper class are input into the right paper class recognition device 201 and a score value 304 is the score value calculated when the sample images included in the left scissor class are input into the right paper class recognition device 201. The vertical line of each score represents the position of a value of zero.

In this case, it is understood that the score value 301 calculated when the sample images included in the right paper class are input into the right paper class recognition device 201 and the score value 303 calculated when the sample images included in the left paper class are input into the right paper class recognition device 201 are showing higher scores compared with the score value 302 and the score value 304.

In the same manner, a score value 305 is the score value calculated when the sample images included in the right paper class are input into the right scissor class recognition device 202, a score value 306 is the score value calculated when the sample images included in the right scissor class are input into the right scissor class recognition device 202, a score value 307 is the score value calculated when the sample images included in the left paper class are input into the right scissor class recognition device 202 and a score value 308 is the score value calculated when the sample images included in the left scissor class are input into the right scissor class recognition device 202.

In this case, it is understood that the score value 306 calculated when the sample images included in the right scissor class are input into the right scissor class recognition device 202 and the score value 308 calculated when the sample images included in the left scissor class are input into the right scissor class recognition device 202 are showing higher scores compared with the score value 305 and the score value 307.

In the same manner, a score value 309 is the score value calculated when the sample images included in the right paper class are input into the left paper class recognition device 203, a score value 310 is the score value calculated when the sample images included in the right scissor class are input into the left paper class recognition device 203, a score value 311 is the score value calculated when the sample images included in the left paper class are input into the left paper class recognition device 203 and a score value 312 is the score value calculated when the sample images included in the left scissor class are input into the left paper class recognition device 203.

In this case, it is understood that the score value 309 calculated when the sample images included in the right paper class are input into the left paper class recognition device 203 and the score value 311 calculated when the sample images included in the left paper class are input into the left paper class recognition device 203 are showing higher scores compared with the score value 310 and the score value 312.

In the same manner, a score value 313 is the score value calculated when the sample images included in the right paper class are input into the left scissor class recognition device 204, a score value 314 is the score value calculated when the sample images included in the right scissor class are input into the left scissor class recognition device 204, a score value 315 is the score value calculated when the sample images included in the left paper class are input into the left scissor class recognition device 204 and a score value 316 is the score value calculated when the sample images included in the left scissor class are input into the left scissor class recognition device 204.

In this case, it is understood that the score value 314 calculated when the sample images included in the right scissor class are input into the left scissor class recognition device 204 and the score value 316 calculated when the sample images included in the left scissor class are input into the left scissor class recognition device 204 are showing higher scores compared with the score value 313 and the score value 315.

When the table relating to scores such as these is obtained, in step S13 (FIG. 9), grouping processing is executed by the grouping unit 105 (FIG. 5). The grouping will be described again with reference to FIGS. 13 and 14. Each of FIGS. 13 and 14 are the tables shown in FIG. 12 and are diagrams with markings with regard to a portion focused on when grouping.

Figure 13:
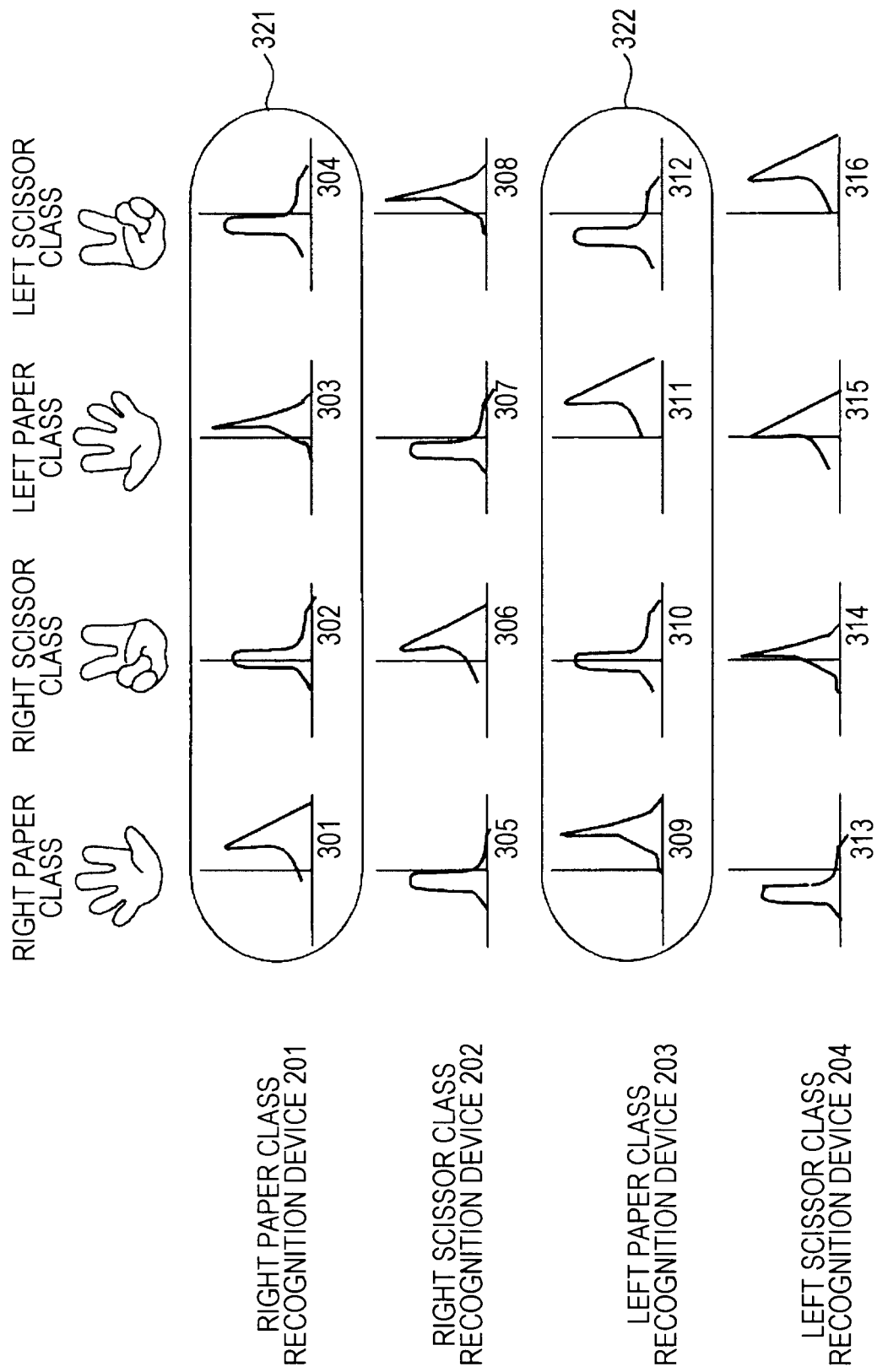
FIG. 13 is a diagram for describing grouping.
Figure 14:
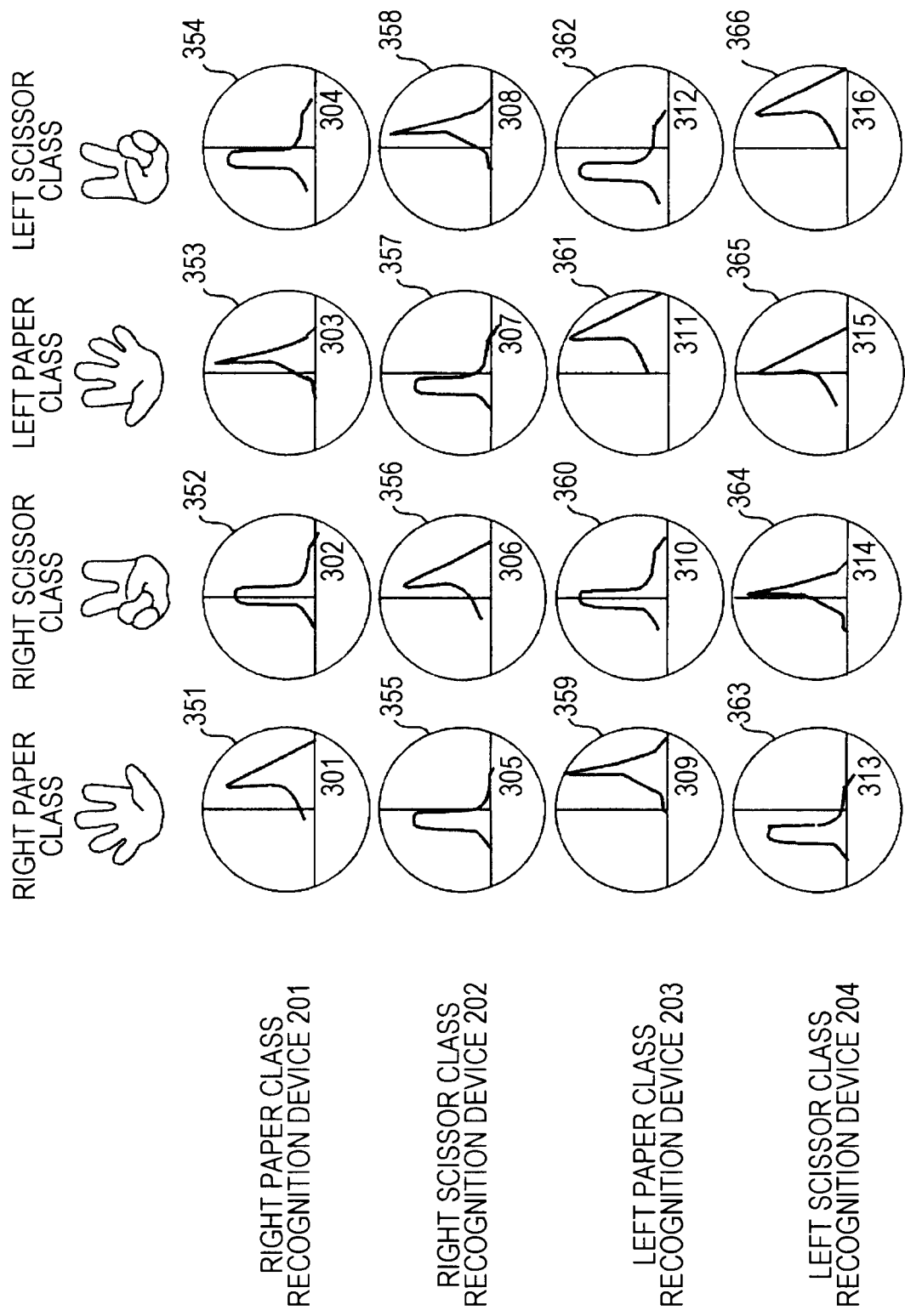
FIG. 14 is a diagram for describing grouping.

In the table shown in FIG. 13, there are two markings. The first is a marking 321 focusing on the score distribution when the sample images are processed by the right paper class recognition device 201, and the second is a marking 322 focusing on the score distribution when the sample images are processed by the left paper class recognition device 203. In this manner, there is a grouping method where the entire score distribution of a specific recognition device and the entire score distribution of another recognition device are compared and the similar recognition devices are extracted.

When the similar recognition devices are extracted, for example, a distance is calculated using a portion of the score value surrounded by the marking 321 and a portion of the score value surrounded by the marking 322, and by determining whether or not the distance is close, it is possible to determine the level of similarity. In this manner, in the case of grouping using the entire score distribution, it is possible to perform grouping processing using, for example, a K-means clustering method.

Next, referring to FIG. 14, the case when performing grouping from the similarities between each distribution will be described. A marking 351 shows a focus on the score value 301 and a marking 352 shows a focus on the score value 302. In the same manner, the markings 353 to 366 respectively show a focus on each of the score values 303 to 316.

In this manner, there is a focus on each score value, and grouping may be performed by finding the similarities in each of the score values. The similarities in each of the score values are performed by calculating the distance of each score value. For example, distances between each of the score value 301 and the score value 302, the score value 301 and the score value 303, and the score value 301 and the score value 304 are calculated. The distances may be calculated for each of all of the score values, the distances of the close score values in a table may be calculated, or the distances may be calculated with only the score values of different recognition devices as targets.

It is determined that the closer the distance between the score values, the greater the similarities. The group processing may be performed by grouping recognition devices with greater similarities. In the case of performing grouping using the similarities between each distribution in this manner, it is possible to perform grouping using, for example, spectral clustering.

In the case of performing grouping using the similarities between each distribution as described with reference to FIG. 14, it is possible to perform grouping by effectively distinguishing partial similarities.

Also, the groupings described with reference to FIGS. 13 and 14 both calculate distribution distances, but it is possible for the method of calculating the distances and the method of measuring the distances to use KL divergence, chi-squared distance or the like. Also, the average value may be calculated and the average value may be set as the distance. Furthermore, it is possible to apply a method such as setting the degree of recognition as the distance.

For example, in the case where it is determined that the distance of the right paper class recognition device 201 and the left paper class recognition device 203 are close and the distance of the right scissor class recognition device 202 and the left scissor class recognition device 204 are close in the results of grouping using the entire score distribution as described with reference to FIG. 13, recognition devices are created according to the results.

That is, in step S14, the class grouped by the grouping unit 105 is set as one class and learning is performed again. The setting of the grouped class as one class is, in the example described above, creating a recognition device (set as one class) combining the right paper class recognition device 201 and the left paper class recognition device 203 (right paper class and left paper class) and creating a recognition device (set as one class) combining the right scissor class recognition device 202 and the left scissor class recognition device 204 (right scissor class and left scissor class).

Figure 15:
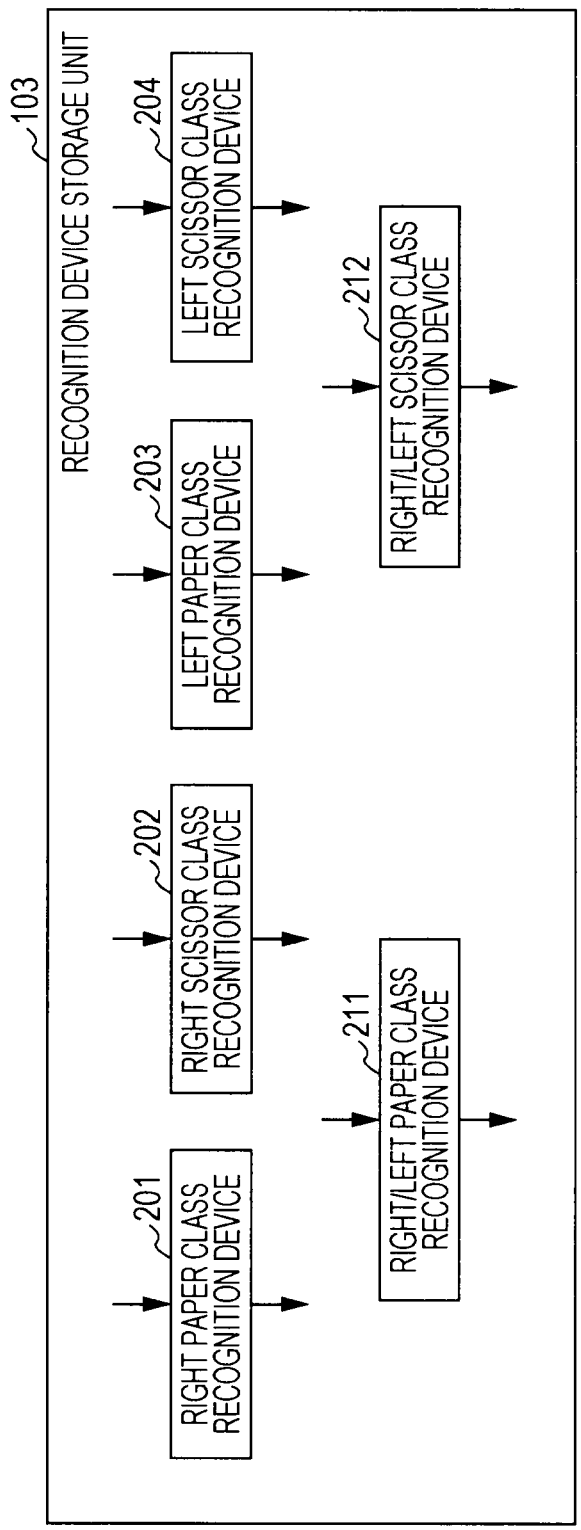
FIG. 15 is a diagram for describing a recognition device.

As a result, as shown in FIG. 15, a right/left paper class recognition device 211 combining the right paper class recognition device 201 and the left paper class recognition device 203 is created and is stored in the recognition device memory unit 103, and a right/left scissor class recognition device 212 combining the right scissor class recognition device 202 and the left scissor class recognition device 204 is created and is stored in the recognition device memory unit 103. Then, with the right/left paper class recognition device 211 and the right/left scissor class recognition device 212 as new recognition devices, the processing of steps S11 onward are repeated (learning is performed again).

Also, when performing learning again, the grouped class is set as one class, and the processing of steps S11 onward are repeated with the grouped class as a new class. That is, for example, in the example described above, the right paper class and the left paper class are set as one class and a right/left paper class (not shown) is created, and the right scissor class and the left scissor class are set as one class and one class of a right/left scissor class (not shown) is created. Then, learning is performed again by the processing of steps S11 onward being performed again using the newly created right/left paper class and right/left scissor class.

Figure 16:
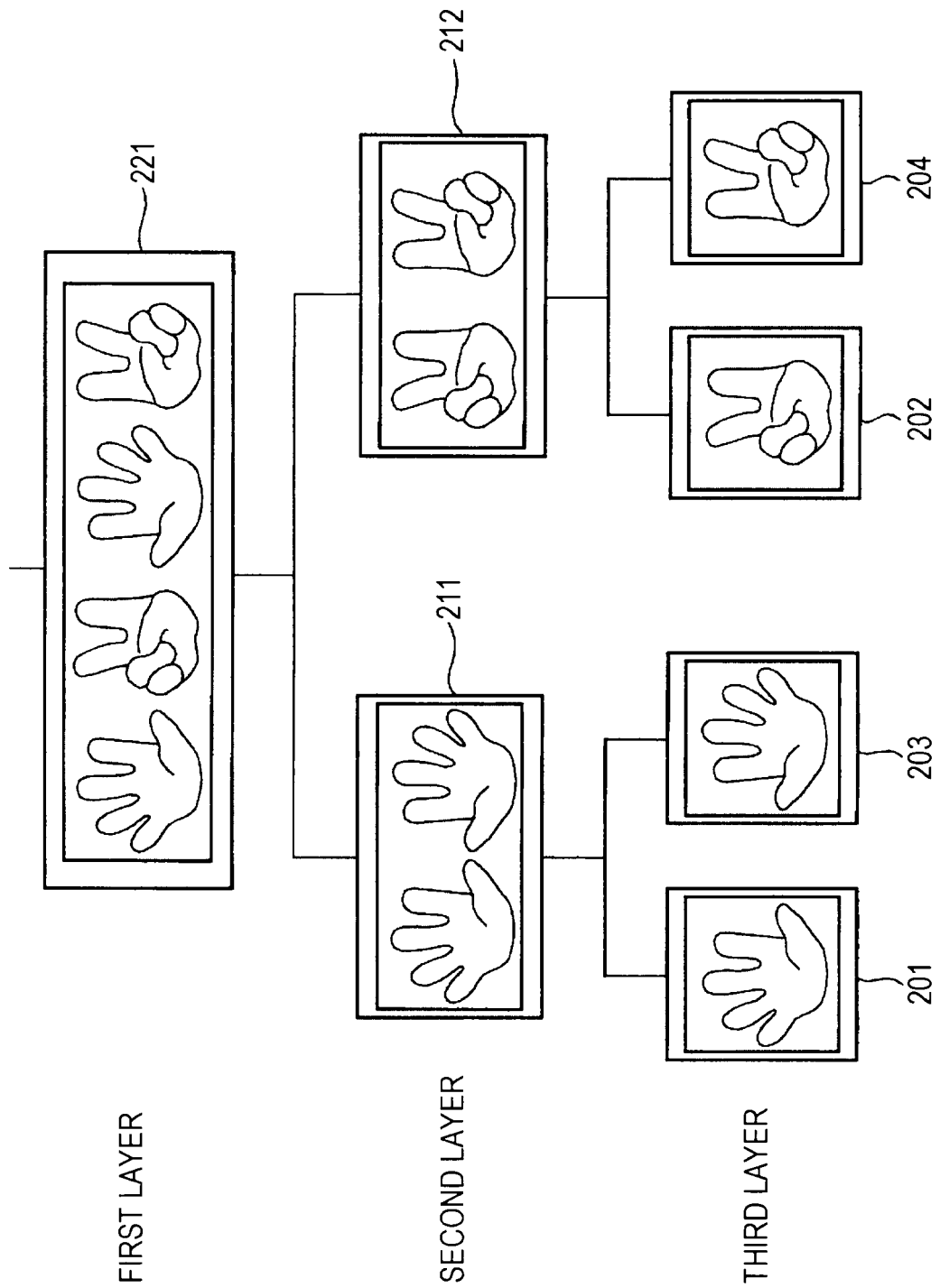
FIG. 16 is a diagram for describing a tree structure.

When there is a state where there are classes and the sample images are stored in the sample memory unit 102 as shown in FIG. 10 and there is a state where the recognition devices are stored in the recognition device memory unit 103 as shown in FIG. 11, FIG. 16 shows an example of a tree structure created when the processing such as that described above is performed.

The tree structure shown in FIG. 16 includes a right/left paper class and right/left scissor class recognition device 221 which recognizes a right paper, a right scissor, a left paper and a left scissor in a first layer, and includes the right/left paper class recognition device 211 and the right/left scissor class recognition device 212 in a second layer. The right/left paper class recognition device 211 in the second layer includes the right paper class recognition device 201 and the left paper class recognition device 203 as a third layer. In the same manner, the right/left scissor class recognition device 212 of the second layer includes the right scissor class recognition device 202 and the left scissor class recognition device 204 as a third layer.

In this manner, it is possible to create the tree structure by calculating the score for each class, performing grouping using the distribution of the scores and grouping together the recognition devices with close distances.

Description about learning of tree structures will be further added and description about learning of recognition devices which configure tree structures will be further added. As methods relating to the learning of tree structures described above, three methods below are considered. The methods 1 to 3 shown below are examples in the case when boosting is supposed.

Method 1

(i) Tree structure configured in advance using the method described above.

(ii) WL (weak learner) is defined in advance and learns.

In method 1, each of the recognition devices configuring the tree structure are configured by weak learner devices and learning is performed with the number of the weak learner devices defined in advance by human beings. The tree structure may be created by the method such as that described above, or may be designed by human beings.

Method 2

(i) Tree structure configured in advance using the method described above.

(ii) The number of the weak learner devices is decided during learning.

(iii) Division timing is performed when a reduction in learning errors has become small.

In method 2, the configuring of the tree structure in advance is the same as method 1, but the deciding of the number of the weak learner devices, which configure the recognition devices which configure the tree structure, in the learning process is different from method 1. Also, the decision on the number of the weak learner devices depends on the division timing. When learning at a specific recognition device (weak learner device), learning at the recognition device is halted and divided at a timing when it is possible to determine that no reduction in errors at the recognition device are expected even if learning is continued further. Learning is performed while the division timing is determined due to the reduction in errors in this manner and the number of the weak learner devices is decided.

Method 3

(i) Learning is performed while deciding both the tree structure and the number of the weak learner devices.

(ii) The division timing is performed when a reduction in learning errors has become small.

(iii) Affinity rows between score distributions for each sample are calculated and spectral clustering is performed.

In method 3, while learning and creating the tree structure, the number of the weak learner devices are learnt and decided. It is possible to create (learn) the tree structure as described above. Also, the decision on the number of the weak learner devices depends on the division timing as in method 2, and is performed by performing division when the reduction in learning errors has become small. Also, in method 3, when performing grouping for creating the tree structure, calculating affinity rows between score distributions for each sample and performing spectral clustering is a preferable configuration.

By applying any one of methods 1 to 3, the tree structure may be created, and the number of the weak learner devices which configure the tree structure may be decided. Although boosting with the weak learner devices has been described as an example, the invention is not limited to boosting. When creating the tree structure, the distance is calculated using the score to determine the closeness of the recognition devices.

The recognition device may not be boosting as long as the recognition device outputs the score when a specific image is input. That is, it is possible to apply the embodiment of the invention to recognition devices other than boosting.

It also means that it is possible to apply the embodiment of the invention. Instead of the specific image, when a specific video, a specific voice or the like is input, if it is the recognition device which outputs the score, it also means that it is possible to apply the invention. That is, it is possible to apply the invention without depending on the type of input data such as images, video and voices.

Figure 17:
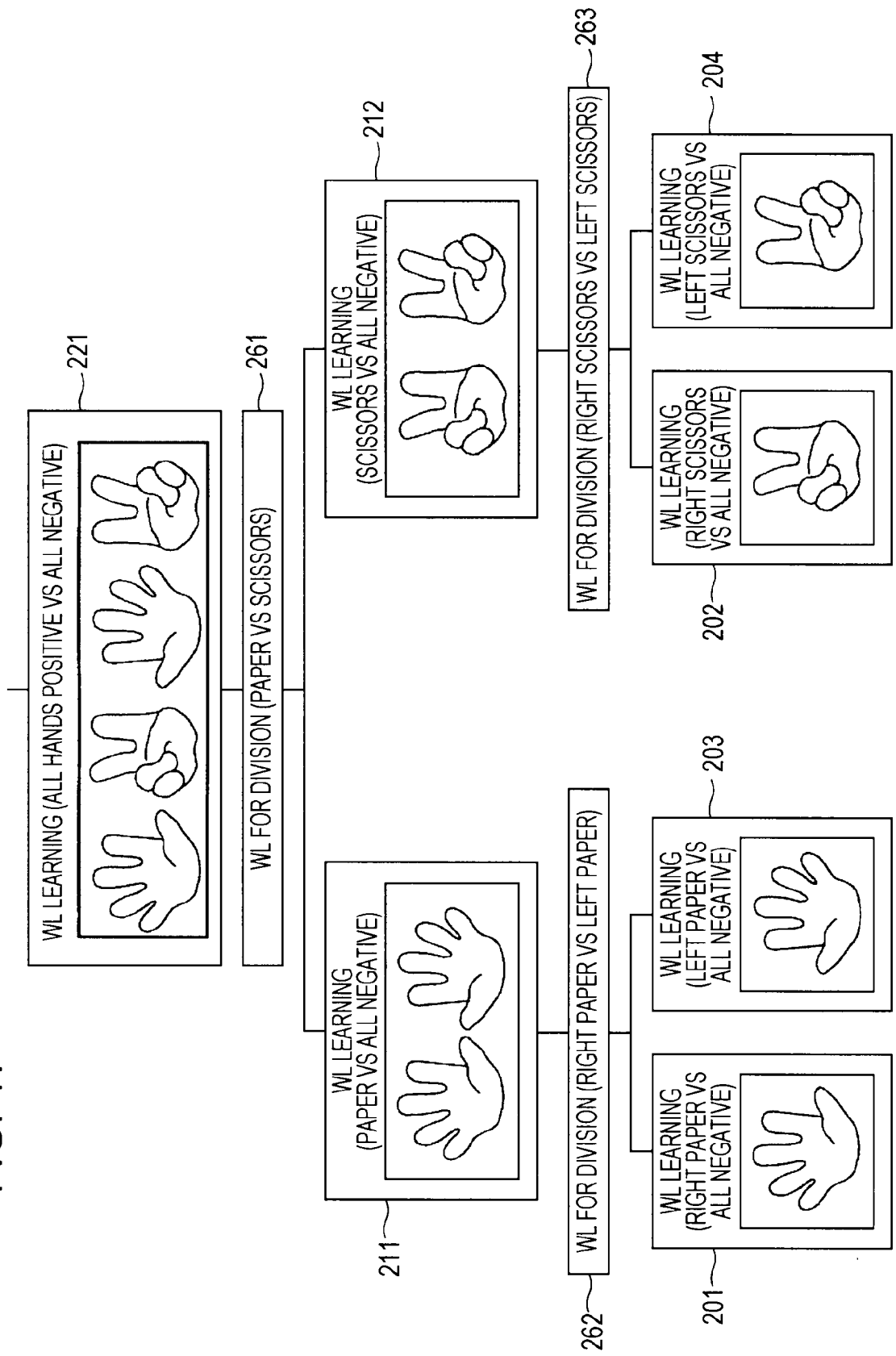
FIG. 17 is a diagram for describing learning of a weak learner.

The processing when deciding the number of the weak learner devices and this like in the tree structure shown in FIG. 16 will be described with reference to FIG. 17.

The learning of the weak learner devices (WL) of the right/left paper class and right/left scissor class recognition device 221 is performed using images of all of the hands and images without the hands. The images of all of the hands are images showing at least one shape from each of the hand shapes of a right paper, a left paper, a right scissor and a left scissor. Also, images of hand shapes other than these hand shapes may be included as sample images when learning. The images of the hands are used as positive images. The images without the hands are used as negative images, and are images not showing the hands such as nature images and the like.

Since learning is performed by inputting the images of the hands and the images without the hands, the right/left paper class and right/left scissor class recognition device 221 is the recognition device which outputs the recognition result of "true" when the image showing the hands is input and which outputs the recognition result of "false" when the image not showing the hands is input.

As the learning by the right/left paper class and right/left scissor class recognition device 221 progresses, a state is reached where the errors are reduced and an effect is not expected even if learning is continued further. When a state where it is determined that errors have been reduced is reached in this manner, processing for division is performed.

A weak learner device 261 for division is prepared, and learning is performed with regard to the weak learner device 261 (recognition device 261). The later stage (after division) of the recognition device of the right/left paper class and right/left scissor class recognition device 221 is the right/left paper class recognition device 211 which recognizes paper and the right/left scissor class recognition device 212 which recognizes scissors. As such, the learning of the recognition device 261 is the learning for determining whether or not paper or scissors is shown in the image which is the processing target.

Only the images of paper or scissors are input into the recognition device 261 as the sample images during learning. The paper and scissors include a right paper, a left paper, a right scissor and a left scissor. By performing learning of the recognition device 261, a recognition device is created which outputs the recognition result of "true" if it is paper (or it may be the reverse where it is "true" if it is scissors). The error rate when paper or scissors are recognized is reduced and the learning processing is halted when, for example, the error rate is equal to or less than a predetermined threshold.

Next, the learning of the right/left paper class recognition device 211 is performed. In the learning of the right/left paper class recognition device 211, the images of paper (including the images of right paper and the images of left paper) are used as the positive images and the images such as nature images are used as the negative images. The learning is halted at a point in time when the error rate is reduced as the result of the learning.

When the learning of the right/left paper class recognition device 211 is halted, the processing for division is performed. A weak learner device (recognition device) 262 for division is prepared, and learning is performed with regard to the recognition device 262. The later stage (after division) of the recognition device of the right/left paper class recognition device 211 is the right paper class recognition device 201 which recognizes right paper and the left paper class recognition device 203 which recognizes left paper. As such, the learning of the recognition device 262 is the learning for determining whether or not right paper or left paper is shown in the image which is the processing target. The learning is halted at a point in time when the error rate is reduced as the result of the learning.

In the recognition device 262, when the learning for division is halted, learning of the right paper class recognition device 201 is performed. In the learning of the right paper class recognition device 201, only the images of right paper are used as the positive images and the images such as nature images are used as the negative images. The learning is halted at a point in time when the error rate is reduced as the result of the learning.

In the same manner, learning of the left paper class recognition device 203 is performed. In the learning of the left paper class recognition device 203, only the images of left paper are used as the positive images and the images such as nature images are used as the negative images. The learning is halted at a point in time when the error rate is reduced as the result of the learning.

After learning such as this is performed or in parallel to when learning such as this being performed, the learning processing of the right/left scissor class recognition device 212 is also performed. In the learning of the right/left scissor class recognition device 212, the images of scissors (including the images of right scissors and the images of left scissors) are used as the positive images and the images such as nature images are used as the negative images. The learning is halted at a point in time when the error rate is reduced as the result of the learning.

When the learning of the right/left scissor class recognition device 212 is halted, the processing for division is performed. A weak learner device (recognition device) 263 for division is prepared, and learning is performed with regard to the recognition device 263. The later stage (after division) of the recognition device of the right/left scissor class recognition device 212 is the right scissor class recognition device 202 which recognizes right scissors and the left scissor class recognition device 204 which recognizes left scissors. As such, the learning of the recognition device 263 is the learning for determining whether or not right scissors or left scissors is shown in the image which is the processing target. The learning is halted at a point in time when the error rate is reduced as the result of the learning.

In the recognition device 263, when the learning for division is halted, learning of the right scissor class recognition device 202 is performed. In the learning of the right scissor class recognition device 202, only the images of right scissors are used as the positive images and the images such as nature images are used as the negative images. The learning is halted at a point in time when the error rate is reduced as the result of the learning.

In the same manner, learning of the left scissor class recognition device 204 is performed. In the learning of the left scissor class recognition device 204, only the images of left scissors are used as the positive images and the images such as nature images are used as the negative images. The learning is halted at a point in time when the error rate is reduced as the result of the learning.

In this manner, the learning of each recognition device is performed and the number of the weak learner devices which configure each of the recognition devices is decided.

If the embodiment of the invention is applied in this manner, it is possible to create the tree structure. Also, it is possible to configure the tree structure so as it is possible to effectively obtain the recognition result to be finally obtained. Also, in the case where the recognition devices which configure the tree structure are configured by, for example, weak learner devices based on boosting, it is possible to appropriately set the number of the weak learner devices.

Figure 18:
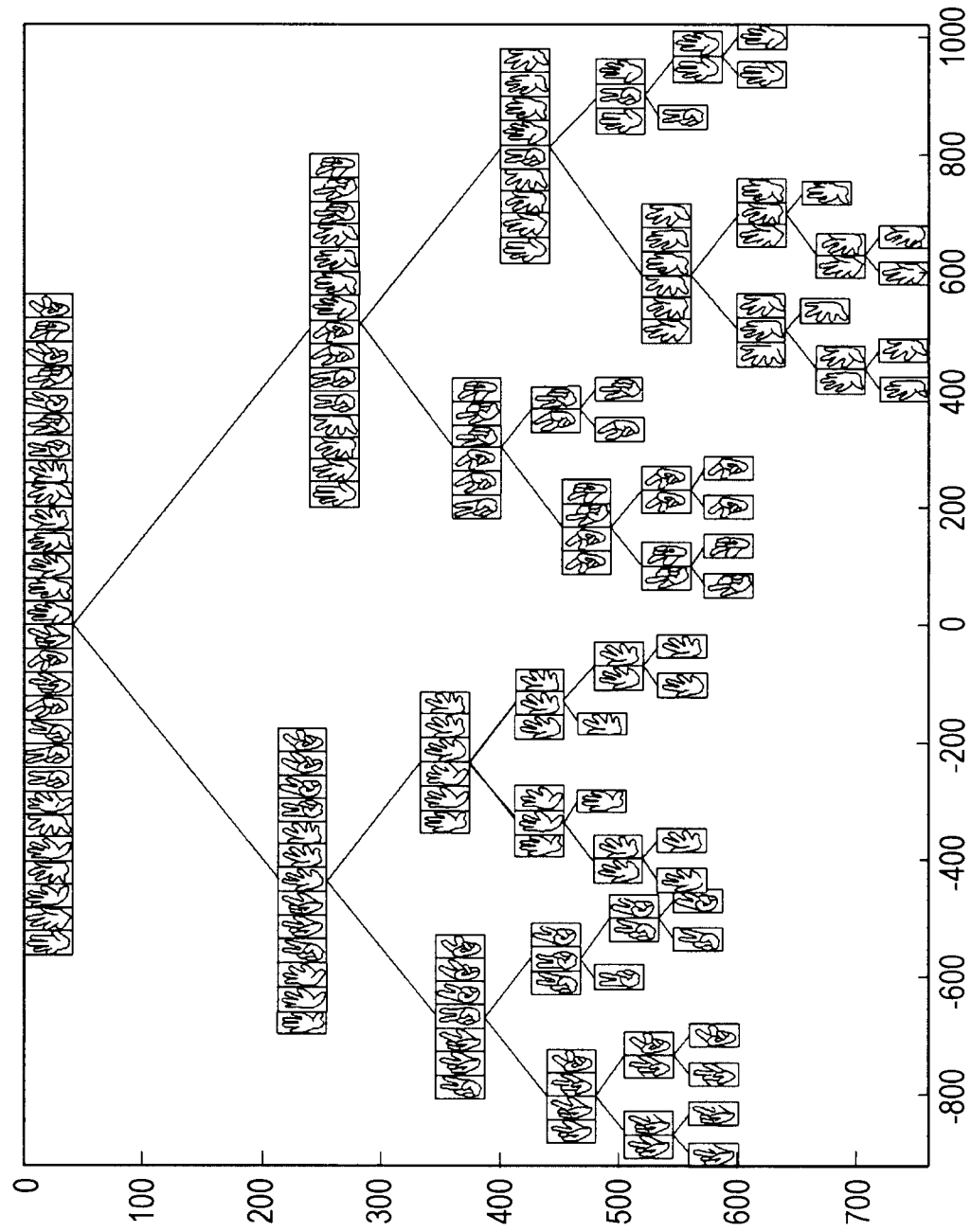
FIG. 18 is a diagram illustrating an example of a created tree structure.

FIG. 18 shows an example of the case where a tree structure which recognizes 28 classes is created in this manner. The tree structure shown in FIG. 18 is a tree structure which recognizes each of a class 1 of zero-degree right paper, a class 2 of left-30-degree right paper, a class 3 of right-30-degree right paper, a class 4 of left-45-degree right paper, a class 5 of right-45-degree right paper, a class 6 of left-60-degree right paper, and a class 7 of right-60-degree right paper.

Also, the tree structure shown in FIG. 18 is a tree structure which recognizes each of a class 8 of zero-degree right scissors, a class 9 of left-30-degree right scissors, a class 10 of right-30-degree right scissors, a class 11 of left-45-degree right scissors, a class 12 of right-45-degree right scissors, a class 13 of left-60-degree right scissors, and a class 14 of right-60-degree right scissors.

Also, the tree structure shown in FIG. 18 is a tree structure which recognizes each of a class 15 of zero-degree left paper, a class 16 of left-30-degree left paper, a class 17 of right-30-degree left paper, a class 18 of left-45-degree left paper, a class 19 of right-45-degree left paper, a class 20 of left-60-degree left paper, and a class 21 of right-60-degree left paper.

Also, the tree structure shown in FIG. 18 is a tree structure which recognizes each of a class 22 of zero-degree left scissors, a class 23 of left-30-degree left scissors, a class 24 of right-30-degree left scissors, a class 25 of left-45-degree left scissors, a class 26 of right-45-degree left scissors, a class 27 of left-60-degree left scissors, and a class 28 of right-60-degree left scissors.

In the case of creating the tree structure for recognizing each of the 28 classes of class 1 to 28 by the method described above, it is understood by referring to FIG. 18 that the second layer which is second from the top is divided by the inclination of the hands. The left side of the diagram is the recognition device which recognizes the hands inclined in a right direction and the right side of the diagram is the recognition device which recognizes the hands inclined in a left direction. That is, in this case, it has the meaning that, after the recognition of a hand, it is determined that the recognizing of the inclination of the hands is better in terms of efficiently obtaining the final recognition result than the recognizing of whether it is paper or scissors, and a tree structure such as this is created.

Furthermore, it is understood by referring to FIG. 18 that the third layer which is third from the top is divided by the recognition devices which recognize each of scissors or paper. If, for example, a human being was to design such a tree structure, it is thought that it takes time for trial and error until a tree structure such as this is reached. However, by applying the embodiment of the invention, it is possible to reduce the time for trial and error.

In this manner, it is confirmed that, if the recognition processing is actually performed using the tree structure, it is possible to efficiently recognize 28 classes.

In this manner, according to the embodiment, it is possible to automatically create the tree structure using class labels of samples. Also, since there are instructor labels, the final output will be the labels, but since it is possible to perform recognition while also using characteristics amounts in the tree structure, the total dictionary size becomes smaller and it is possible to rapidly recognize.

Memory Medium

It is possible to perform the series of processing described above using hardware or using software. In the case that the series of processing is performed using software, a program configured by the software is installed in a computer. Here, in the computer, there is included a computer with specialized hardware built in, or, for example, a typical personal computer which is able to perform various types of functions by installing various types of programs.

Figure 19:
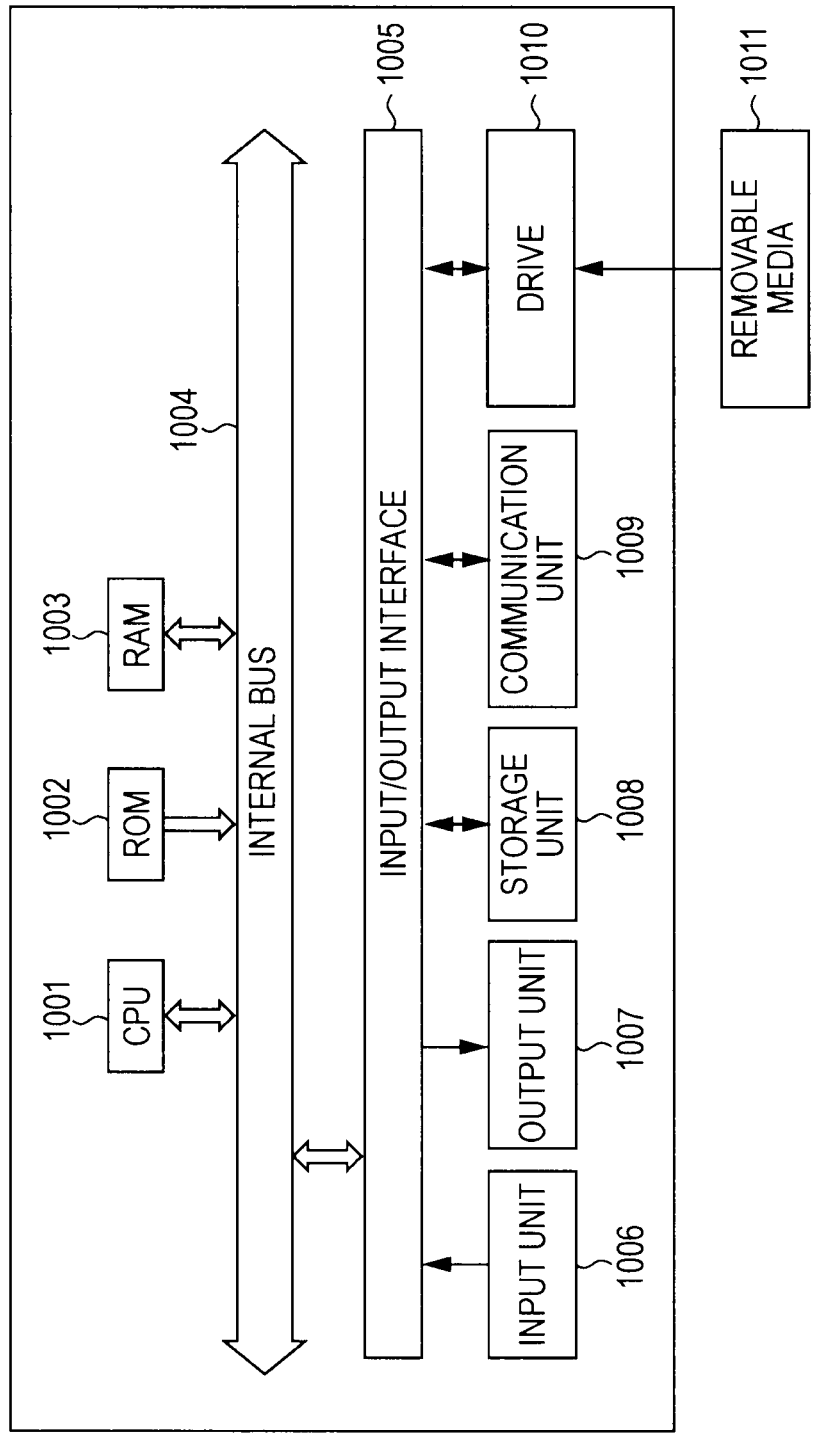
FIG. 19 is a diagram for describing a recording medium.

FIG. 19 is a block diagram illustrating a configuration example of computer hardware which performs the series of processing described above using a program. In the computer, a CPU (central processing unit) 1001, a ROM (read only memory) 1002 and a RAM (random access memory) 1003 are connected to each other by a bus 1004. An input/output interface 1005 is also connected to the bus 1004. The input/output interface 1005 is connected to an input unit 1006, an output unit 1007, a memory unit 1008, a communication unit 1009 and a driver 1010.

The input unit 1006 is formed by a keyboard, a mouse, a microphone or the like. The output unit 1007 is formed by a display, a speaker or the like. The memory unit 1008 is formed by a hard disk, a nonvolatile memory or the like. The communication unit 1009 is formed by a network interface or the like. The driver 1010 drives a removable media 1011 such as a magnetic disc, an optical disc, a magnetic optical disc or a semiconductor memory.

In the computer configured as above, the series of processing described above is performed by the CPU 1001 performing loading of a program stored in, for example, the memory unit 1008 in the RAM 1003 via the input/output interface 1005 and the bus 1004.

It is possible to provide the program executed by the computer (CPU 1001) by recording it on the removable media 1011 as, for example, package media. Also, it is possible to provide the program via a wired or wireless transmission media such as a local area network, the internet, or digital satellite broadcasting.

In the computer, it is possible to install the program in the memory unit 1008 via the input/output interface 1005 by loading the removable media 1011 into the driver 1010. Also, it is possible to install the program in the memory unit 1008 by receiving it in the communication unit 1009 via the wired or wireless transmission media. Otherwise, it is possible to install the program in advance in the ROM 1002 or the memory unit 1008.

Here, the program executed by the computer may be a program which performs processing in a time series in the sequence described in the embodiments of the invention or may be a program which performs processing in parallel or at a necessary timing such as when a request is performed.

Also, in the embodiments of the invention, a term "system" refers to the entire apparatus configured by a plurality of apparatuses.

Here, the embodiments of the invention are not limited by the embodiments described above and various alternations are possible within the range which does not deviate from the gist of the invention.

The present application contains subject matter related to that disclosed in Japanese Priority Patent Application JP 2010-066633 filed in the Japan Patent Office on Mar. 23, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, which creates a tree structure used by a recognition apparatus which recognizes specific information using the tree structure, comprising:
   memory means which stores data including the information to be recognized and a label identifying the information;
   a plurality of recognition devices which recognize the information and output a high score value when the data including the information is in a class corresponding to a recognition device into which the data is input; and
   grouping means which performs grouping of the plurality of recognition devices using a score distribution obtained when each of the data is input into each of the plurality of recognition devices, the grouping means merging classes corresponding to all of the recognition devices placed in a group such that all of the data for each of the classes corresponding to each of the recognition devices in a group is placed into a single class to create grouped devices, the grouping means calculating a distance of the score distribution for each of the plurality of recognition devices and grouping all of the plurality of recognition devices having scores within a threshold.

2. The information processing apparatus according to claim 1, wherein the grouping means calculates a distance of the score distribution and performs grouping by clustering the distances.

3. The information processing apparatus according to claim 2, wherein the calculation of the distance of the score distribution uses chi-squared distance.

4. The information processing apparatus according to claim 2, wherein the calculation of the distance of the score distribution uses KL-divergence.

5. The information processing apparatus according to claim 2, wherein the clustering uses spectral clustering.

6. The information processing apparatus according to claim 1, wherein each recognition device is a discrimination device which has learned in advance.

7. The information processing apparatus according to claim 1, wherein the information is a specific object or a specific voice, and the data is image data, video data or voice data.

8. An information processing method of an information processing apparatus, which is an information processing apparatus which creates a tree structure used by a recognition apparatus which recognizes specific information using the tree structure, and which at least is provided with memory means which stores data including the information to be recognized and a label identifying the information, comprising:
   performing grouping of a plurality of recognition devices using a score distribution obtained when each of the data read from the memory means is input into each of the plurality of recognition devices which recognize the information and which output a high score value when the data including the information is in a class corresponding to a recognition device into which the data is input, the grouping including merging classes corresponding to all of the recognition devices placed in a group such that all of the data for each of the classes corresponding to each of the recognition devices in a group is placed into a single class, the grouping including calculating a distance of the score distribution for each of the plurality of recognition devices and grouping all of the plurality of recognition devices having scores within a threshold.

9. A non-transitory computer readable medium encoded with a computer-readable program which executes processing in an information processing apparatus which creates a tree structure used by a recognition apparatus recognizing specific information using the tree structure, and which at least is provided with memory means storing data including the information to be recognized and a label identifying the information, comprising:
   performing grouping of a plurality of recognition devices using a score distribution obtained when each of the data read from the memory means is input into each of the plurality of recognition devices which recognize the information and output a high score value when the data including the information is in a class corresponding to a recognition device into which the data is input, the grouping including merging classes corresponding to all of the recognition devices placed in a group such that all of the data for each of the classes corresponding to each of the recognition devices in a group is placed into a single class, the grouping including calculating a distance of the score distribution for each of the plurality of recognition devices and grouping all of the plurality of recognition devices having scores within a threshold.

10. An information processing apparatus, which creates a tree structure used by a recognition apparatus which recognizes specific information using the tree structure, comprising:
   a memory unit which stores data including the information to be recognized and a label identifying the information;
   a plurality of recognition devices which recognize the information and output a high score value when the data including the information is in a class corresponding to a recognition device into which the data is input; and
   a grouping unit which performs grouping of the plurality of recognition devices using a score distribution obtained when each of the data is input into each of the plurality of recognition devices, the grouping unit merging classes corresponding to all of the recognition devices placed in a group such that all of the data for each of the classes corresponding to each of the recognition devices in a group is placed into a single class, the grouping unit calculating a distance of the score distribution for each of the plurality of recognition devices and grouping all of the plurality of recognition devices having scores within a threshold.

* * * * *